(12) United States Patent
Ohtake

(10) Patent No.: US 6,556,356 B2
(45) Date of Patent: Apr. 29, 2003

(54) ZOOM LENS SYSTEM

(75) Inventor: Motoyuki Ohtake, Saitama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/962,351

(22) Filed: Sep. 26, 2001

(65) Prior Publication Data

US 2002/0067551 A1 Jun. 6, 2002

(30) Foreign Application Priority Data

Sep. 28, 2000 (JP) ........................................ 2000-296970
Sep. 28, 2000 (JP) ........................................ 2000-296976

(51) Int. Cl.[7] .............................................. G02B 15/14
(52) U.S. Cl. ...................... 359/687; 359/684; 359/685; 359/686; 359/715; 359/774; 359/740
(58) Field of Search ................................ 359/687, 684, 359/685, 686, 715, 774, 740

(56) References Cited

U.S. PATENT DOCUMENTS

| | | | | |
|---|---|---|---|---|
| 4,523,814 A | * | 6/1985 | Okudaira | 359/687 |
| 4,890,904 A | * | 1/1990 | Ito | 359/680 |
| 5,694,253 A | * | 12/1997 | Shibayama | 359/684 |
| 6,101,042 A | * | 8/2000 | Sato | 359/684 |
| 6,324,018 B1 | * | 11/2001 | Kawamura | 359/687 |
| 6,353,505 B1 | * | 3/2002 | Yoneyama | 359/684 |

FOREIGN PATENT DOCUMENTS

| | | |
|---|---|---|
| JP | 8-94933 | 4/1996 |
| JP | 11-030750 | 2/1999 |
| JP | 11-084202 | 3/1999 |

* cited by examiner

*Primary Examiner*—Evelyn A Lester
(74) *Attorney, Agent, or Firm*—Miles & Stockbridge P.C.

(57) ABSTRACT

A zoom lens system includes, in order from an object, a first lens group having positive refractive power, a second lens group having negative refractive power, a third lens group having positive refractive power, and a fourth lens group having positive refractive power. When the lens system is changed from a wide-angle end to a telephoto end, each lens group is moved to the object side such that the separation between the first lens group and the second lens group increases, the separation between the second lens group and the third lens group decreases, and the separation between the third lens group and the fourth lens group decreases. The fourth lens group is composed of four lens elements arranged, in order from the object, a first positive lens element, a first negative lens element, a second positive lens element, and a second negative lens element.

21 Claims, 22 Drawing Sheets

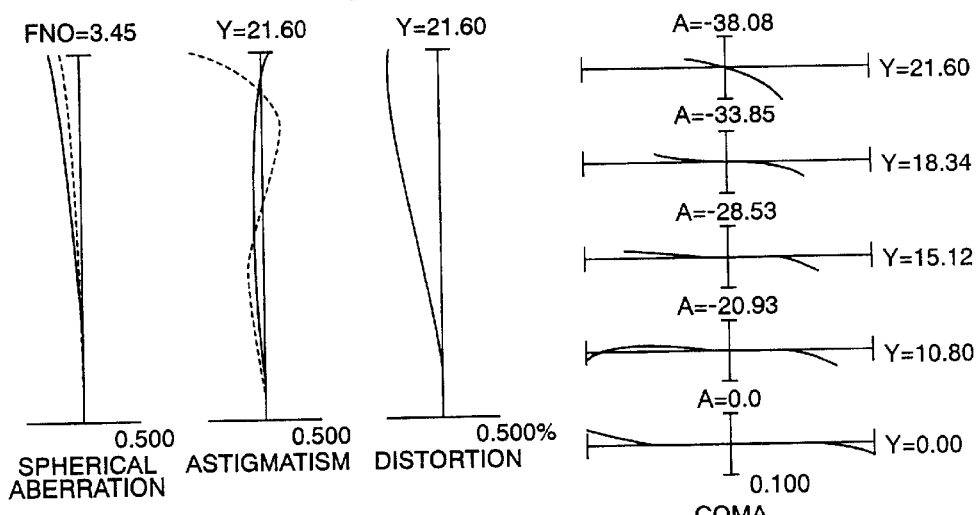
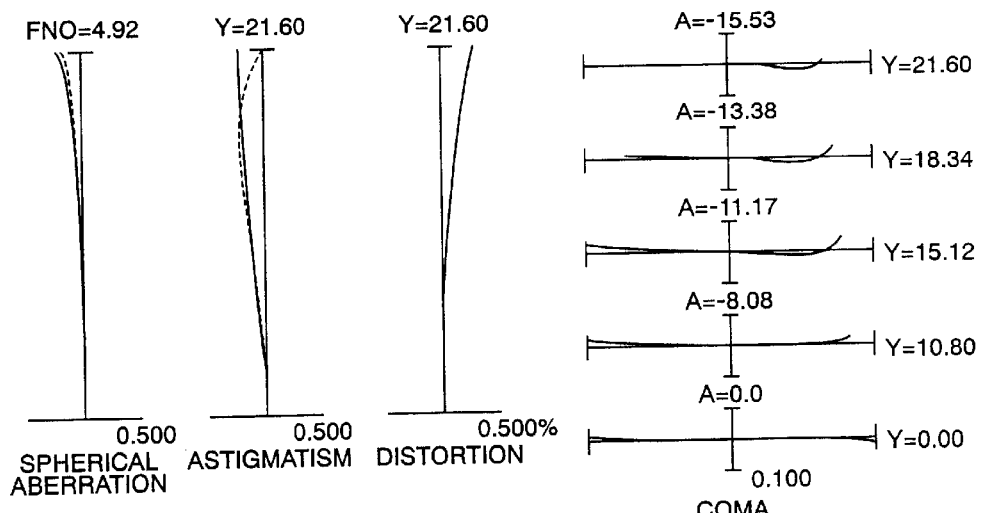
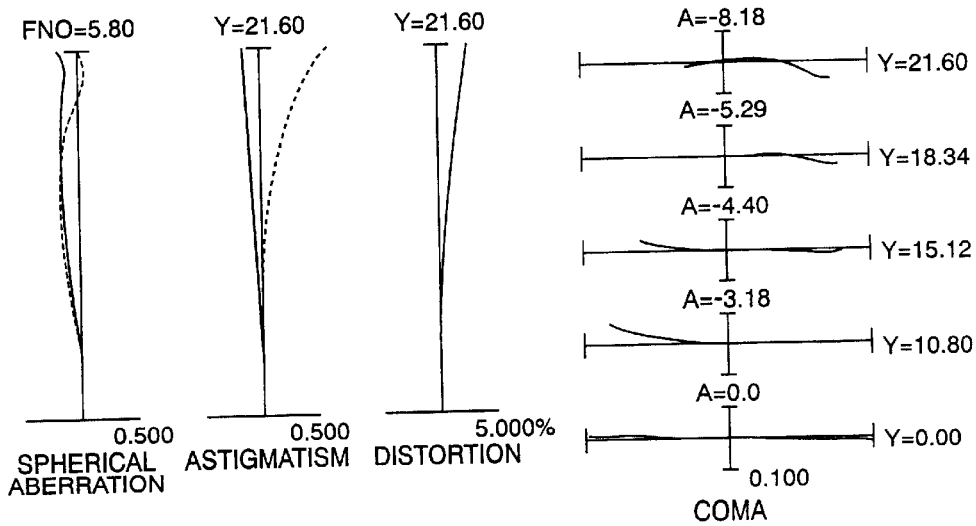

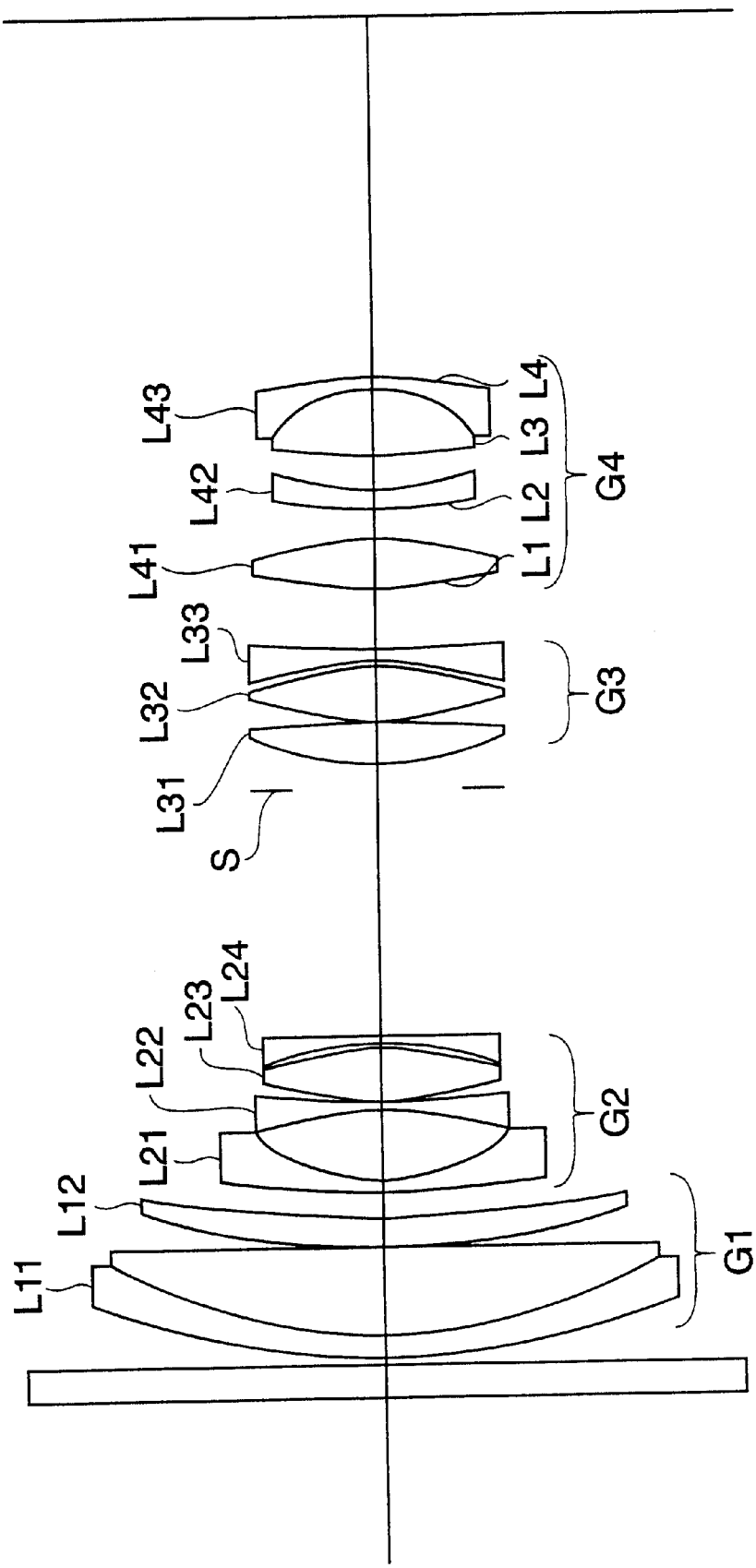

ZOOM LENS SYSTEM

INCORPORATION BY REFERENCE

The disclosures of the following priority applications are herein incorporated by reference:

Japanese Patent Application No. 2000-296970 filed Sep. 28, 2000; and

Japanese Patent Application No. 2000-296976 filed Sep. 28, 2000.

BACKGROUND OF THE INVENTION

1. Field of the Invention

The present invention relates to a zoom lens system and, in particular, relates to a zoom lens system having a high zoom ratio.

2. Description of Related Art

Since degree of freedom for optical design has been increased with recent progress in manufacturing technology regarding an aspherical lens and a lens barrel, a zoom lens system having a high zoom ratio achieved by using a well-known positive-negative-positive-positive four-lens-group type has been proposed. The positive-negative-positive-positive four-lens-group type is composed of, in order from an object, a first lens group having positive refractive power, a second lens group having negative refractive power, a third lens group having positive refractive power, and a fourth lens group having positive refractive power.

Specifically, it has been disclosed in Japanese Patent Application Laid-Open No. 8-94933 and in Japanese Patent Application Laid-Open No. 11-30750.

In Japanese Patent Application Laid-Open No. 8-94933, a zoom lens system having a zoom ratio of about five is achieved by arranging an aspherical plane in a second lens group with increasing an angle of view in the wide-angle end state. In Japanese Patent Application Laid-Open No. 11-30750, a zoom lens system having an increased zoom ratio achieved by arranging a large number of aspherical surfaces is proposed. Moreover, in Japanese Patent Application Laid-Open No. 11-84202, a lens barrel suitable for a zoom lens having a zoom ratio of ten is proposed.

However, in a conventional positive-negative-positive-positive four-lens-group type, a high zoom ratio and compactness have been achieved by increasing refractive power of each lens group, so that optical performance has been greatly degraded by assembling error produced while manufacturing. Moreover, the number of lenses consisting of each lens group becomes large, so that transportabillty cannot be improved. Furthermore, variation in off-axial aberrations produced while changing the lens group positions is difficult to correct well.

However, in a conventional positive-negative-positive-positive four-lens-group type, when increasing a zoom ratio, transportability has been liable to be spoiled by the reasons such that the lens diameter becomes large or that the total lens length cannot be shorten.

SUMMARY OF THE INVENTION

The present invention is made in view of the aforementioned problems and has an object to provide a zoom lens system with a zoom ratio of seven or more suitable for compactness capable of obtaining stable optical performance in spite of reducing the number of lenses.

According to one aspect of the present invention, a zoom lens system includes, in order from an object, a first lens group having positive refractive power, a second lens group having negative refractive power, a third lens group having positive refractive power, and a fourth lens group having positive refractive power. Each lens group is moved to the object side such that when the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases. An aperture stop is arranged in the vicinity of the third lens group. The fourth lens group is composed of four lens elements arranged, in order from the object, a first positive lens element, a first negative lens element, a second positive lens element, and a second negative lens element.

In one preferred embodiment of the present invention, the first positive lens element has a double convex shape and the first negative lens element has a meniscus shape having a convex surface facing to the object side.

In one preferred embodiment of the present invention, the following conditional expression is satisfied:

$$0.12 < r41/r42 < 0.45 \tag{1}$$

where r41 denotes the radius of curvature to the object side of the first positive lens element arranged to the most object side of the fourth lens group, and r42 denotes the radius of curvature to the image side of the first negative lens element arranged second in order from the object side of the fourth lens group.

In one preferred embodiment of the present invention, the second positive lens element and the second negative lens element are cemented together forming a cemented lens having positive refractive power.

In one preferred embodiment of the present invention, at least one of the following conditional expressions is satisfied:

$$0.15 < D1/ft < 0.25 \tag{2}$$

$$0.15 < |f2|/(fw \cdot ft)^{1/2} < 0.25 \tag{3}$$

where D1 denotes the separation along the optical axis between the first lens group and the second lens group in the telephoto end state, ft denotes the focal length of the zoom lens system as a whole in the telephoto end state, f2 denotes the focal length of the second lens group, and fw denotes the focal length of the zoom lens system as a whole in the wide-angle end state.

In one preferred embodiment of the present invention, the following conditional expression is satisfied:

$$0.5 < d2/d1 < 2 \tag{4}$$

where d2 denotes the separation between the first negative lens element arranged second in order from the object side of the fourth lens group and the second positive lens element arranged to the image side of the first negative lens element, and d1 denotes the separation between the first positive lens element arranged most object side of the fourth lens group and the first negative lens element arranged to the image side of the first positive lens element.

According to another aspect of the present invention, a zoom lens system includes, in order from an object, a first lens group having positive refractive power, a second lens group having negative refractive power, a third lens group having positive refractive power; and a fourth lens group having positive refractive power. Each lens group is moved to the object side such that when the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases. The second lens group is composed of four lens elements arranged, in order from the object, a negative lens having a concave surface facing to an image side, a double concave negative lens, a double convex positive lens, and a negative lens having a concave surface facing to the object side. The following conditional expressions are satisfied:

$$3<|f2B|/|f2|<5 \quad (5)$$

$$0.3<f2P/|f2B|<0.45 \quad (6)$$

where f2B denotes the focal length of the three lenses in the second lens group having four lens elements arranged to the image side in the second lens group, f2 denotes the focal length of the second lens group, and f2P denotes the focal length of the double convex positive lens arranged in the second lens group.

In one preferred embodiment of the present invention, the following conditional expression is satisfied:

$$0.14<|f2|/(fw \cdot ft)^{1/2}<0.24 \quad (7)$$

where ft denotes the focal length of the zoom lens system as a whole in the telephoto end state, and fw denotes the focal length of the zoom lens system as a whole in the wide-angle end state.

In one preferred embodiment of the present invention, an aperture stop is arranged between the second lens group and the third lens group. In this case, it is preferable that the aperture stop is moved with the third lens group in a body while changing the state of lens group positions.

In one preferred embodiment of the present invention, the first lens group is composed of three lenses arranged, in order from the object, a negative lens having a convex surface facing to the object side, a first positive lens having a convex surface facing to the object side, and a second positive lens having a convex surface facing to the object side. The following conditional expression is satisfied:

$$2<f13/f1<4 \quad (8)$$

where f13 denotes the focal length of the positive lens arranged to the image side in the first lens group having two positive lenses, and f1 denotes the focal length of the first lens group.

In one preferred embodiment of the present invention, the first lens group is composed of, in order from the object, a cemented lens constructed by a negative meniscus lens having a convex surface facing to the object side and a positive lens having a convex surface facing to the object side together, and a positive meniscus lens having a convex surface facing to the object.

In one preferred embodiment of the present invention, the following conditional expression is satisfied:

$$0.45<D2W/D1T<0.60 \quad (9)$$

where D2W denotes the separation along the optical axis between the second lens group and the third lens group in the wide-angle end state, and D1T denotes the separation along the optical axis between the first lens group and the second lens group in the telephoto end state.

BRIEF DESCRIPTION OF THE DRAWINGS

FIGS. 9A–9C are graphs showing various aberrations of Example 3 of the first embodiment in the wide-angle end state, the intermediate focal length state, and the telephoto end state, respectively when focusing at infinity.

FIG. 20 is a sectional view schematically showing the configuration of a zoom lens system according to Example 7 of the second embodiment of the present invention.

DESCRIPTION OF THE PREFERRED EMBODIMENTS

Figure 1A:
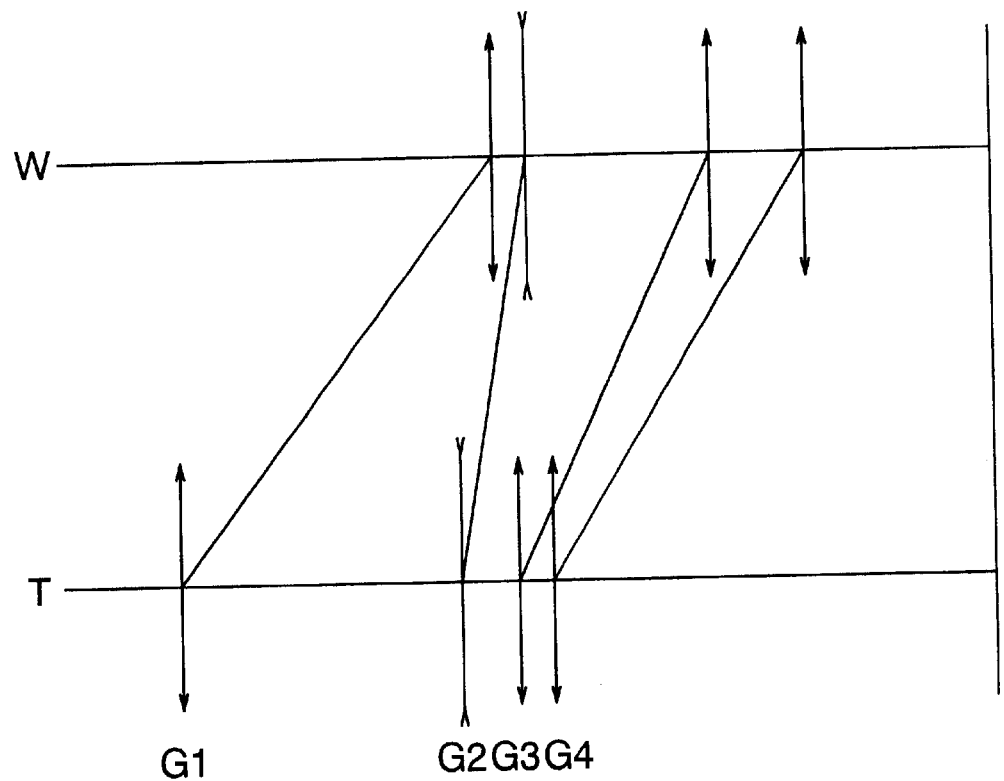
FIG. 1A is a diagram showing a distribution of refractive power in a zoom lens system according to the present invention, together with the movement of each lens group during zooming.

The aforementioned positive-negative-positive-positive four-lens-group type has been known as a zoom lens system. This lens type is composed of, in order from an object, a first lens group having positive refractive power, a second lens group having negative refractive power, a third lens group having positive refractive power, and a fourth lens group having positive refractive power.

When the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases. In order to correct variation in off-axis aberration produced while changing the state of lens group positions, each lens group is moved.

Generally, it is a shortcut for achieving a high zoom ratio to increase refractive power of each lens group. For example, as shown in FIG. 1B, when the first lens group G1 having the refractive power $\phi 1$ is separated from the second lens group G2 having refractive power $\phi 2$ by d, a composite refractive power $\Phi$ is expressed by the following expression:

$$\Phi = \phi 1 + \phi 2 - \phi 1 \cdot \phi 2 \cdot d.$$

When the separation changes to d+Δd, the composite refractive power $\Phi'$ is expressed by the following expression:

$$\Phi' = \phi 1 + \phi 2 - \phi 1 \cdot \phi 2 \cdot (d + \Delta d).$$

Variation in the composite refractive power ΔΦ is expressed by the following expression:

$$\Delta \Phi = \Phi' = \Phi$$
$$= -\varphi 1 \cdot \varphi 2 \cdot \Delta d.$$

Accordingly, when the refractive power of the first lens group G1 and that of second lens group G2 are increased, variation in the composite refractive power ΔΦ becomes large. In other words, when the refractive power of the lens groups composing the lens system is increased, variation in the composite refractive power becomes large without changing the separation, so that a zoom ratio can be increased without enlarging the lens diameter.

In order to correct degradation of optical performance produced when increasing refractive power of each lens group, it is a shortcut to introduce an aspherical surface to a lens element of a lens group. In particular, it is quite effective to increase refractive power of the second lens group, which actively contributes for zooming. Accordingly, almost all proposed zoom lens system has shown a tendency to increase refractive power of each lens group and to employ a lot of aspherical surfaces.

On the other hand, in order to change the focal length in general, there is another way that the separation is actively changed instead of increasing refractive power. In other words, in the aforementioned variation in the composite refractive power $\Delta\Phi = -\phi 1 \cdot \phi 2 \cdot \Delta d$, it is the way that the variation in the separation Δd is actively changed. in conventional lens system, when the variation in the separation becomes large, off-axis ray passing through the first or fourth lens group being separated from the aperture stop in the wide-angle end state particularly passes away from the optical axis, so that the lens diameter becomes large.

Therefore, in the present invention, a predetermined zooming ratio is obtained by thinning the thickness of the lens group not increasing refractive power nor increasing the lens diameter even if increasing variation in the separation.

<First Embodiment>

As described above, when refractive power of each lens group is increased, it causes such problems that optical performance has been greatly degraded by assembling error produced while manufacturing and that it is essential to control the lens group positions with extremely high accuracy. However, the present invention makes it possible to mitigate these problems.

Specifically, in a first embodiment of the present invention, the lens construction of a fourth lens group is simplified.

In a conventional four-group type zoom lens, the fourth lens group is composed of three subgroups, in order from an object, a positive subgroup, a negative subgroup, and a positive group, and each subgroup is composed of a plurality of lens elements. In the fourth lens group, on-axis rays pass through it spreading widely, and off-axis rays pass through it without large difference in height with respect to the state of lens group positions, so that the number of lens elements composing the fourth lens group is liable to become large in order to correct various aberrations within the fourth lens group.

In this embodiment of the present invention, in order from the object, a positive subgroup is composed of a single positive lens element L1, a negative subgroup is composed of a single negative lens element L2, and a positive subgroup is composed of a single positive lens element L3 and a single negative lens element L4.

In the conventional zoom lens, the number of lens elements has increased in order to correct aberrations well, and, as a result, the optical design has become difficult because the total thickness of the lens system has become large. On the other hand, in the present embodiment of the present invention, predetermined optical performance is obtained by an effect of reducing the thickness achieved by composing the fourth lens group with simple construction.

By reducing the thickness of the fourth lens group, the present embodiment of the present invention employs the effect of securing a sufficient back focal length in the wide-angle end state and of reducing refractive power of the second lens group.

In the wide-angle end state, a first lens group and a second lens group are arranged adjacently, and a combination of the first lens group and the second lens group has negative refractive power. A third lens group and a fourth lens group are arranged with a wide air space from the second lens group, and a combination of the third lens group and the fourth lens group has positive refractive power. The whole refractive power arrangement is negative-positive. Accordingly, if the thickness of the fourth lens group is large, a sufficient back focal length cannot be secured in the wide-angle end state unless refractive power of the second lens group is increased.

In the present embodiment, however, the fourth lens group can be thinner, so that refractive power of the second lens group can be weaken as described above.

If refractive power of the second lens group is weaken, refractive power of the first lens group is also weaken, so that off-axis ray passing through the second lens group passes near the optical axis in the wide-angle end state. In a conventional lens system, since off-axis ray passing through the first lens group has passed widely away from the optical axis in the wide-angle end state where the angle of incident ray is large, it has been difficult to correct off-axis aberrations. On the other hand, in the present embodiment, since off-axis ray passes near the optical axis, the production of off-axis aberration can be suppressed. At the same time, since off-axis ray passing through the second lens group passes away from the optical axis in the wide-angle end state and approaches the optical axis while changing the state of lens group positions to the telephoto end state, off-axis aberrations produced in the wide-angle end state can be corrected actively.

As described above, the present embodiment makes it possible to provide an optical system with a predetermined zooming ratio capable of securing stable optical performance upon manufacturing by thinning the fourth lens group.

In the lens configuration described above, the present embodiment makes it possible to improve optical performance by constructing specially the fourth lens group as described below.

In the present embodiment, in order to well correct off-axis aberrations produced independently in the fourth lens group, it is desirable that the positive lens element L1 has a double convex shape, and the negative lens element L2 has a meniscus shape having a convex surface facing to the object side.

By applying a double convex shape to the positive lens element L1, refractive power can be broken up into both surfaces, so that the production of negative spherical aberration can be suppressed. Moreover, by applying a meniscus shape having a convex surface facing to the object side to the negative lens element L2, off-axis ray is incident to the lens element in a state where the production of aberration is few, so that higher optical performance can be attained.

Furthermore, by constructing the positive lens element L1 and the negative lens element L2 to satisfy the following conditional expression (1), higher optical performance can be expected:

$$0.12 < r41/r42 < 0.45 \tag{1}$$

where r41 denotes the radius of curvature to the object side of the positive lens element L1, and r42 denotes the radius of curvature to the image side of the negative lens element L2.

Conditional expression (1) defines the ratio of the radius of curvature to the object side of the positive lens element L1 to the radius of curvature to the image side of the negative lens element L2.

When the ratio exceeds the upper limit of conditional expression (1), off-axis ray passing through the fourth lens group in the wide-angle end state passes away from the optical axis, so that coma produced on the peripheral portion of the image plane cannot be corrected sufficiently. On the other hand, when the ratio falls blow the lower limit of conditional expression (1), the incident angle of off-axis ray incident on the object side surface of the positive lens element L1 becomes large, so that variation of coma with respect to the angle of view becomes large.

In the present embodiment, by applying simple construction to the fourth lens group, degradation of optical performance produced in the fourth lens group upon manufacturing can be suppressed effectively, so that stable optical performance can be secured upon manufacturing. In particular, when the second positive lens element L3 and the second negative lens element L4 in the fourth lens group are a cemented lens L43, more stable optical performance can be obtained.

In the present embodiment as described above, refractive power of the second lens group is weakened by applying simple lens configuration to the fourth lens group.

It is desirable that the first and second lens groups satisfy the following conditional expressions (2) and (3):

$$0.15 < D1/ft < 0.25 \tag{2}$$

$$0.15 < |f2|/(fw \cdot ft)^{1/2} < 0.25 \tag{3}$$

where D1 denotes the separation along the optical axis between the first lens group and the second lens group in the telephoto end state, ft denotes the focal length of the lens system as a whole in the telephoto end state, f2 denotes the focal length of the second lens group, and fw denotes the focal length of the lens system as a whole in the wide-angle end state.

Conditional expression (2) defines an appropriate range of the separation between the first lens group and the second lens group in the telephoto end state.

When the ratio D1/ft exceeds the upper limit of conditional expression (2), off-axis ray passing through the first lens group in the telephoto end state passes excessively away from the optical axis, so that the lens diameter becomes large. On the other hand, when the ratio falls below the lower limit of conditional expression (2), the total lens length in the telephoto end state becomes too large. Accordingly, portability is spoiled in either case.

Conditional expression (3) defines the focal length of the second lens group.

When the ratio $|f2|/(fw \cdot ft)^{1/2}$ falls below the lower limit of conditional expression (3), off-axis ray passing through the second lens group in the wide-angle end state passes near the optical axis, so that variation in off-axis aberrations with respect to the change in the state of lens group positions cannot be corrected well. On the other hand, when the ratio exceeds the upper limit of conditional expression (3), the lateral magnification of the second lens group in the telephoto end state becomes almost equal magnification, so that it is liable to happen that a solution of the trajectory of zooming does not exist in accordance with the manufacturing error in the focal length of the second lens group or that in the accuracy of the zooming cam. Accordingly, it is necessary to improve the accuracy of each component.

Moreover, in the present embodiment, in order to improve optical performance it is desirable to satisfy the following conditional expression (4):

$$0.5 < d2/d1 < 2 \quad (4)$$

where d2 denotes the separation between the first negative lens element L2 and the second positive lens element L3 in the fourth lens group, and d1 denotes the separation between the first positive lens element L1 and the first negative lens element L2 in the fourth lens group.

Conditional expression (4) defines the separations of the first positive lens element Li, the first negative lens element L2, and the second positive lens element L3.

When the ratio d2/d1 exceeds the upper limit of conditional expression (4), refractive power of the first positive lens L1 locating to the most object side of the fourth lens group becomes too large to the positive direction, so that coma produced on the periphery of the image plane in the wide-angle end state cannot be corrected well. On the other hand, when the ratio falls below the lower limit of conditional expression (4), the total lens length becomes too large in order to secure a sufficient back focal length in the wide-angle end state.

Furthermore, in the present embodiment, it is desirable that an aperture stop is arranged to the object side of the third lens group and that the aperture stop is moved with the third lens group in a body while changing the state of lens group positions.

In order to well correct variation in off-axis aberrations produced with respect to the change in the state of lens group positions, it is inevitable to increase the number of lens groups in which the height of off-axis ray varies largely, and it is important that the separations between the lens groups and the aperture stop are changed actively.

In order to keep the lens diameter of each lens group to be small, it is quite effective to arrange the aperture stop in the vicinity of the center of the lens system.

In the present embodiment, it is desirable for compactness to arrange the aperture stop between the second lens group and the third lens group, where the center of the lens system exists. Variation in off-axis aberrations produced with respect to the change in the state of lens group positions can be corrected well by actively changing the separation between the first lens group and the second lens group locating to the object side of the aperture stop and the separation between the second lens group and the aperture stop. In this case, although the aperture stop may be moved independently of other lens groups, lens barrel mechanism can be simplified by moving the aperture stop with the third lens group in a body.

In the above described present invention, it is desirable to employ an aspherical surface to the most object side lens surface of the second lens group.

In the present invention, since the refractive power of the second lens group becomes weak, off-axis ray incident to the second lens group tends to pass away from the optical axis. Accordingly, it is convenient to correct on-axis aberrations and off-axis aberrations separately. However, it is more suitable to employ an aspherical surface to the most object side lens surface of the second lens group in order to obtain better optical performance in the wide-angle end state. In addition, it is desirable to employ an aspherical surface to the most object side positive lens in the fourth lens group.

In the present invention, off-axis ray passing through the fourth lens group in the wide-angle end state tends to pass away from the optical axis. Accordingly, a ray passing through the periphery of the positive lens tends to be converged excessively, so that correction of coma tends to be insufficient in the periphery of the image plane. To improve optical performance in the periphery of the image plane in the wide-angle end state, it is desirable to employ an aspherical surface to the most object side positive lens in the fourth lens group.

Moreover, in the present invention, in order to suppress variation in various aberrations, it is preferable to move the second lens group along the optical axis while focusing at near object.

Numerical examples according to the first embodiment are explained with reference to accompanying drawings.

In each example, an aspherical surface is expressed by the following expression:

$$x = cy^2/\{1+(1-\kappa c^2 y^2)^{1/2}\} + C_4 y^4 + C_6 y^6 + \ldots$$

where y denotes the height in a vertical direction relative to the optical axis, x denotes displacement in the optical axis direction at the height y (a sag amount), c denotes a reference radius of curvature, κ denotes the conical coefficient, and $C_4$, $C_6$, ... denote aspherical coefficients of respective orders 4, 6, ...

Figure 1B:
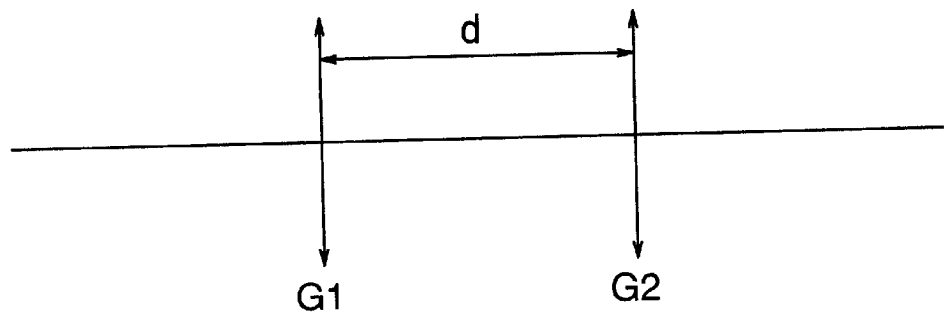
FIG. 1B is a diagram explaining a composite focal length.

FIG. 1A is a diagram showing a distribution of refractive power in a zoom lens system according to each example of the present embodiment, together with the movement of each lens group during zooming. The zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, at least the first lens group G1 and the fourth lens group G4 are moved to the object direction such that the separation between the first lens group G1 and the second lens group G2 increases, the separation between the second lens group G2 and the third lens group G3 decreases, and the separation between the third lens group G3 and the fourth lens group G4 decreases.

EXAMPLE 1

Figure 2:
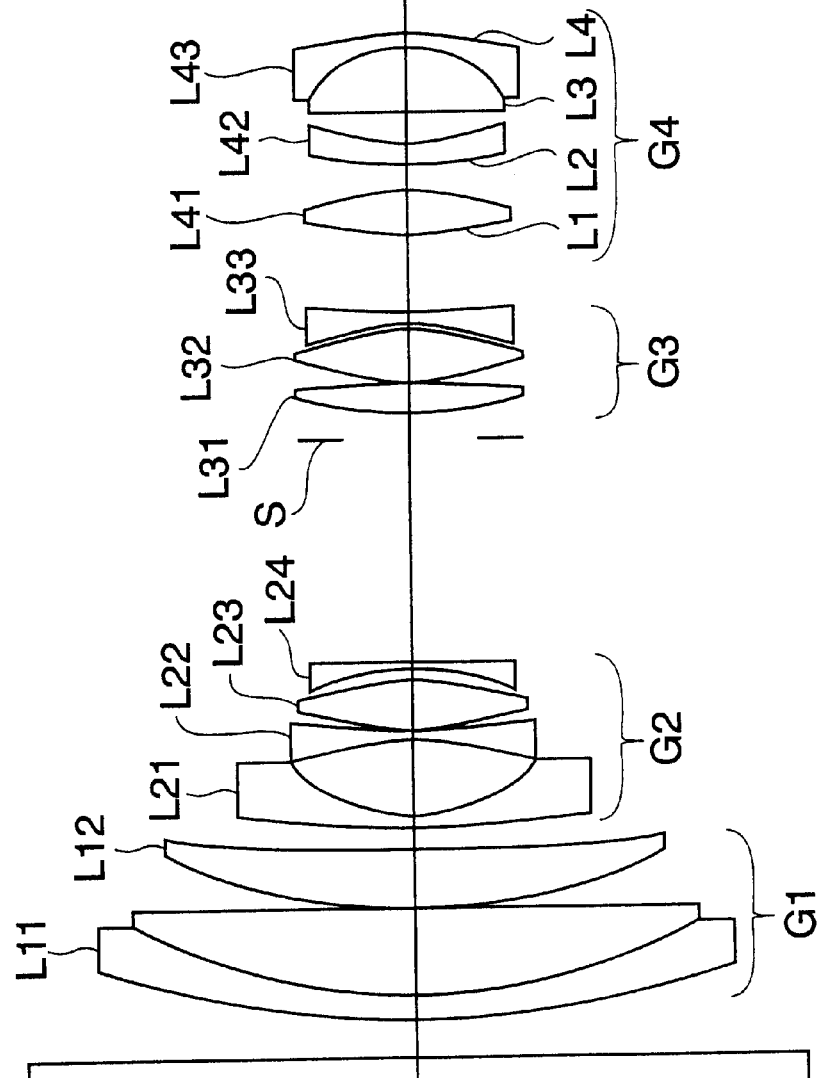
FIG. 2 is a sectional view schematically showing the configuration of a zoom lens system according to Example 1 of a first embodiment of the present invention.

FIG. 2 is a sectional view schematically showing the configuration of a zoom lens system according to Example 1 of the first embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens is L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex lens L31, a double convex lens L32, and a negative lens L33 having a concave surface facing to the object side. A fourth lens group G4 is composed of a double convex lens L41 (=L1), a negative meniscus lens L42 (=L2) having a convex surface facing to the object side, and a cemented lens L43 constructed by a positive lens element L3 having a convex surface facing to the image side cemented with a negative lens element L4 having a concave surface facing to the object side.

In Example 1, an aperture stop S is arranged to the object side of the third lens group G3 and is moved with the third lens group G3 in a body when changing the state of lens group positions. Moreover, the object side of the negative lens L21 is coated with a thin resin film having an aspherical surface.

Various values associated with Example 1 are listed in Table 1. In Table 1, f denotes the focal length, FNO denotes the f-number, 2ω denotes an angle of view. The refractive index is a value at d-line (λ=587.6 nm). In Table 1, the radius of curvature of a plane is denoted by 0.

In Lens Data, the left most column denotes the optical surface number counted in order from the object.

By the way, in all Examples according to the present invention, the same symbols of this Example 1 are used.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

TABLE 1

(Specifications)

f: 28.80~77.04~194.00
FNO: 3.58~5.02~5.80
2ω: 76.17°~30.50°~12.36°

(Lens Data)

| | r | d | n | ν |
|---|---|---|---|---|
| 1 | 0.0000 | 3.000 | 1.51680 | 64.20 |
| 2 | 0.0000 | 3.870 | 1.0 | |
| 3 | 101.3524 | 2.000 | 1.84666 | 23.83 |
| 4 | 55.1234 | 7.950 | 1.60300 | 65.47 |
| 5 | 514.0711 | 0.150 | 1.0 | |
| 6 | 53.8816 | 5.550 | 1.71300 | 53.85 |
| 7 | 188.8507 | (D7) | 1.0 | |
| 8 | 179.2215 | 0.120 | 1.52020 | 52.02 |
| 9 | 96.4600 | 1.000 | 1.80420 | 46.51 |
| 10 | 16.1199 | 6.900 | 1.0 | |
| 11 | −39.5311 | 0.900 | 1.78800 | 47.38 |
| 12 | 66.0766 | 0.200 | 1.0 | |
| 13 | 36.0220 | 4.350 | 1.84666 | 23.78 |
| 14 | −42.4032 | 1.300 | 1.0 | |
| 15 | −24.4705 | 0.900 | 1.75500 | 52.32 |
| 16 | −265.9233 | (D16) | 1.0 | |
| 17 | 0.0000 | 1.000 | 1.0 | aperture stop |
| 18 | 32.3451 | 2.850 | 1.62299 | 58.17 |
| 19 | −274.7066 | 0.100 | 1.0 | |
| 20 | 26.3218 | 4.750 | 1.49700 | 81.61 |
| 21 | −34.1071 | 0.400 | 1.0 | |
| 22 | −29.4561 | 0.900 | 1.83400 | 37.17 |
| 23 | 100.0000 | (D23) | 1.0 | |
| 24 | 41.6895 | 4.100 | 1.56384 | 60.69 |
| 25 | −30.6077 | 2.350 | 1.0 | |
| 26 | 44.5284 | 2.000 | 1.76182 | 26.52 |
| 27 | 24.4366 | 3.150 | 1.0 | |
| 28 | 42887.6240 | 6.050 | 1.59551 | 39.23 |
| 29 | −12.0534 | 1.100 | 1.83481 | 42.72 |
| 30 | −60.8453 | (Bf) | 1.0 | |

(Aspherical Data)
Surface Number 8
κ=+3.8712
$C_4$=+8.6815×10$^{-6}$
$C_6$=−9.5216×10$^{-9}$
$C_8$=+1.9337×10$^{-12}$
$C_{10}$=+9.5983×10$^{-14}$
Surface Number 24
κ=−1.4917
$C_4$=−1.3756×10$^{-5}$
$C_6$=+2.3631×10$^{-8}$
$C_8$=+2.8851×10$^{-11}$
$C_{10}$=+5.3872×10$^{-14}$ (Variable Intervals While Zooming)

| f | 28.8000 | 77.0421 | 193.9990 |
|---|---|---|---|
| D7 | 2.0586 | 22.0892 | 40.2460 |
| D16 | 22.2480 | 11.0145 | 2.0470 |
| D23 | 7.7369 | 4.4472 | 3.2920 |
| BF | 40.8865 | 66.2820 | 79.3436 |

(movement of the second lens group Δ2);
an imaging magnification is −1/30,
the movement to the object side is assumed to be positive.

| f | 28.8000 | 77.0421 | 193.9990 |
|---|---|---|---|
| Δ2 | 0.6120 | 0.6310 | 2.4257 |

(Values for the Conditional Expressions)
f2=×15.0153
(1) (r41−r42)/(r41+r42)=0.261
(2) D1/ft=0.207
(3) |f2|/(fw·ft)$^{1/2}$=0.201
(4) d2/d1=1.340

Figure 3A:
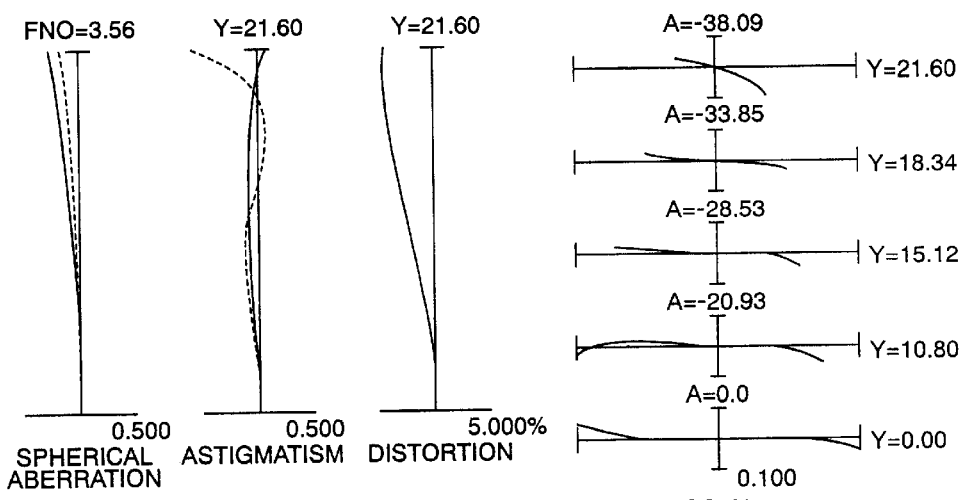
FIGS. 3A–3C are graphs showing various aberrations of Example 1 of the first embodiment in the wide-angle end state, the intermediate focal length state, and the telephoto end state, respectively when focusing at infinity.
Figure 3B:
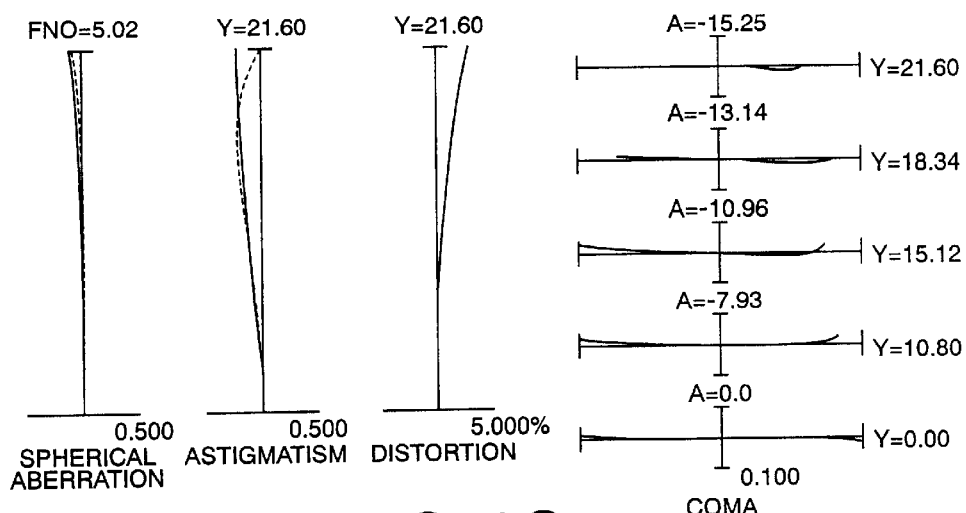
Figure 3C:
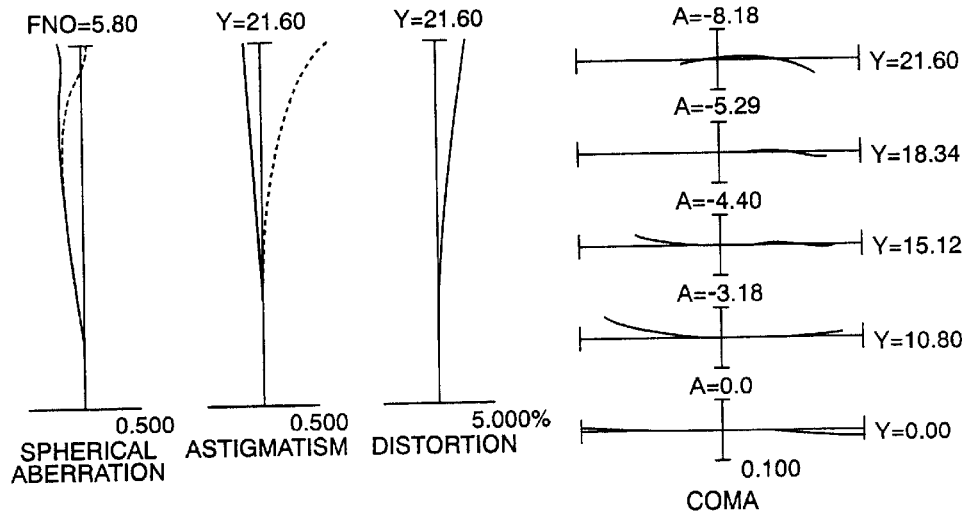

FIGS. 3A–3C are graphs showing various aberrations of Example 1 of the first embodiment in the wide-angle end state (f=28.80), the intermediate focal length state (f=77.04), and the telephoto end state (f=194.00), respectively when focusing at infinity.

Figure 4A:
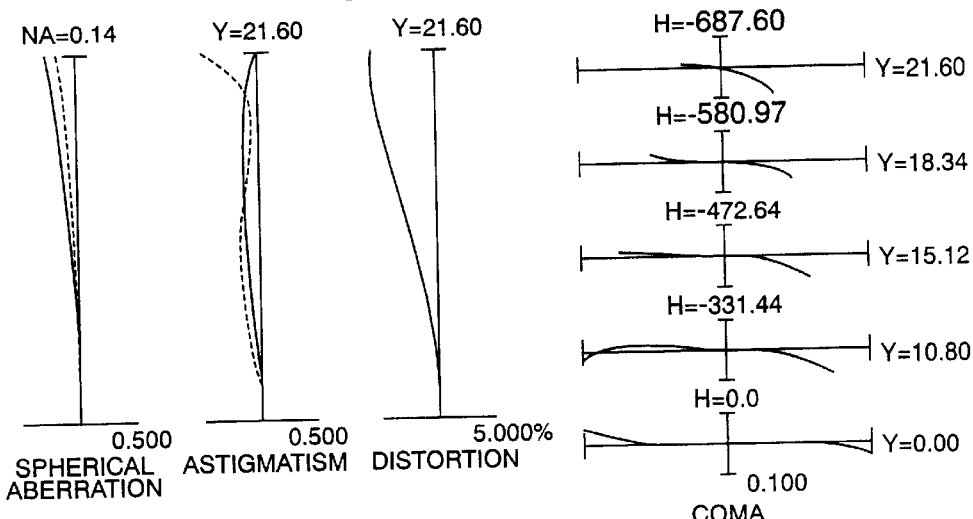
FIGS. 4A–4C are graphs showing various aberrations of Example 1 of the first embodiment in the wide-angle end state, the intermediate focal length state, and the telephoto end state, respectively when focusing at finite distant object.
Figure 4B:
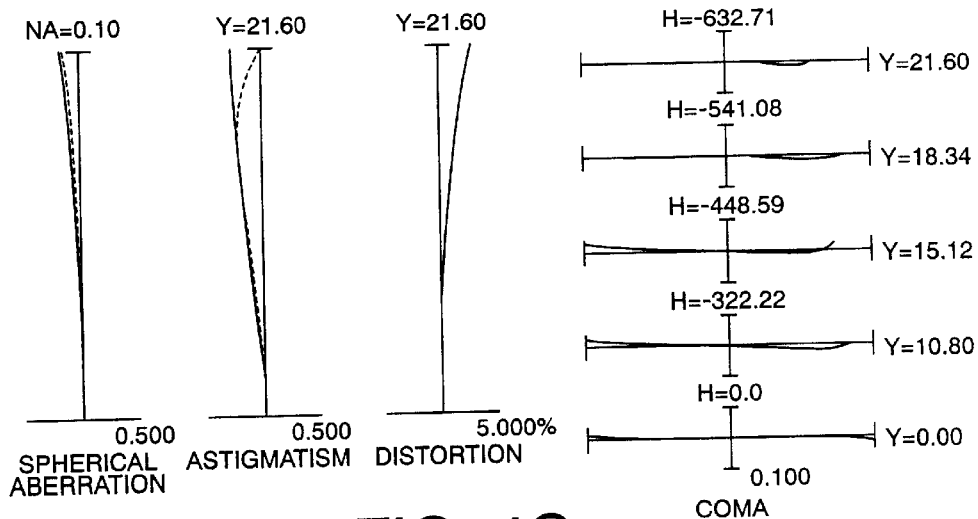
Figure 4C:
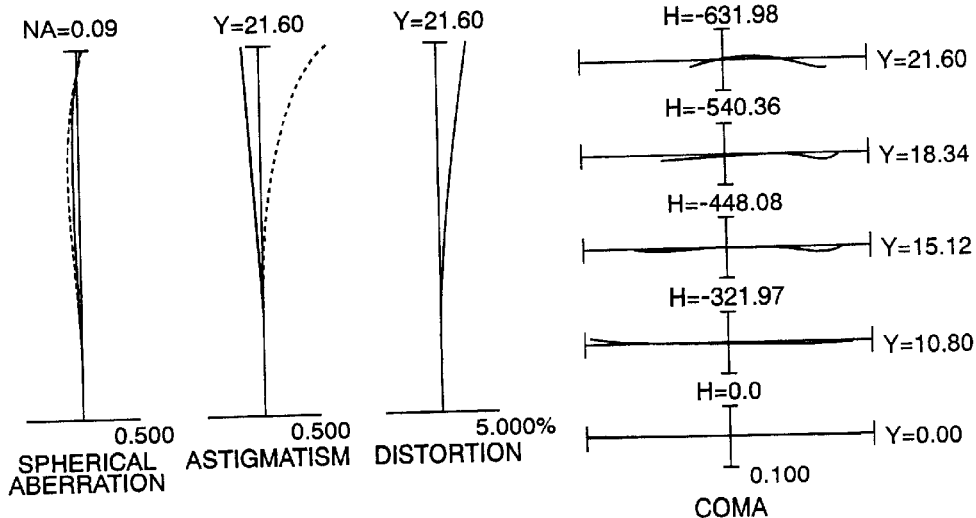

FIGS. 4A–4C are graphs showing various aberrations of Example 1 of the first embodiment in the wide-angle end state (f=28.80), the intermediate focal length state (f=77.04), and the telephoto end state (f=194.00), respectively when focusing at finite distant object (an imaging magnification is −1/30).

In the respective graphs in FIGS. 3A–4C, and in the graphs showing spherical aberration, a solid line denotes spherical aberration and a broken line denotes sine condition and Y denotes an image height. In the graphs showing astigmatism, a solid line indicates a sagittal image plane, and a broken line indicates a meridional image plane. In the graphs showing coma, A denotes an angle of view, H denotes an object height, and coma at respective image heights Y=0, 10.8, 15.12, 18.34, 21.6 are shown. By the way, in all Examples according to the present invention, the same symbols of this Example are used.

As is apparent from the respective graphs showing various aberrations, excellent compensation is made for various aberrations, and superior optical performance is obtained.

EXAMPLE 2

Figure 5:
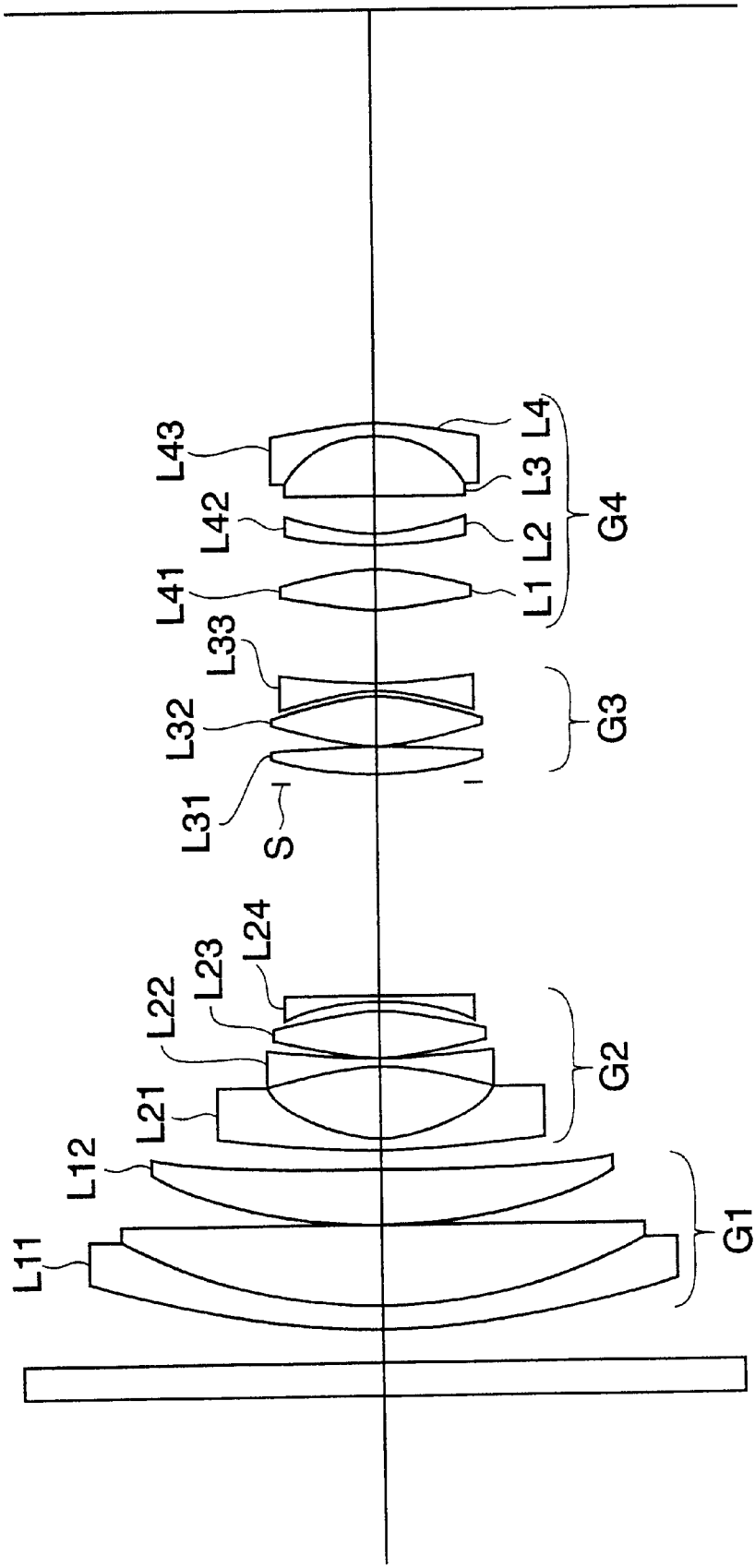
FIG. 5 is a sectional view schematically showing the configuration of a zoom lens system according to Example 2 of the first embodiment of the present invention.

FIG. 5 is a sectional view schematically showing the configuration of a zoom lens system according to Example 2 of the first embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex lens L31, a double convex lens L32, and a negative lens L33 having a concave surface facing to the object side. A fourth lens group G4 is composed of a double convex lens L41 (=L1), a negative meniscus lens L42 (=L2) having a convex surface facing to the object side, and a cemented lens L43 constructed by a positive lens element L3 having a convex surface facing to the image side cemented with a negative lens element L4 having a concave surface facing to the object side.

In Example 2, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface.

Various values associated with Example 2 are listed in Table 2.

TABLE 2

(Specifications)

f: 28.80~77.04~194.00
FNO: 3.61~5.04~5.80
2ω: 76.17°~30.67°~12.36°

(Lens Data)

| | r | d | n | ν |
|---|---|---|---|---|
| 1 | 0.0000 | 3.000 | 1.51680 | 64.20 |
| 2 | 0.0000 | 3.870 | 1.0 | |
| 3 | 104.6936 | 2.000 | 1.84666 | 23.78 |
| 4 | 56.1801 | 8.000 | 1.60300 | 65.47 |
| 5 | 638.1309 | 0.150 | 1.0 | |
| 6 | 53.4848 | 5.600 | 1.71300 | 53.85 |
| 7 | 182.9089 | (D7) | 1.0 | |
| 8 | 165.3460 | 0.120 | 1.52020 | 52.02 |
| 9 | 92.4609 | 1.000 | 1.80420 | 46.51 |
| 10 | 16.0243 | 6.900 | 1.0 | |
| 11 | −38.4504 | 0.900 | 1.77250 | 49.61 |
| 12 | 69.2949 | 0.200 | 1.0 | |
| 13 | 36.1887 | 4.250 | 1.84666 | 23.78 |
| 14 | −44.0866 | 1.300 | 1.0 | |
| 15 | −24.7174 | 0.900 | 1.75500 | 52.32 |
| 16 | −333.4697 | (D16) | 1.0 | |
| 17 | 0.0000 | 1.000 | 1.0 | aperture stop |
| 18 | 34.0807 | 2.800 | 1.65160 | 58.54 |
| 19 | −234.4250 | 0.100 | 1.0 | |
| 20 | 26.7167 | 4.600 | 1.49700 | 81.61 |
| 21 | −35.8958 | 0.400 | 1.0 | |
| 22 | −30.7520 | 0.900 | 1.83400 | 37.17 |
| 23 | 100.0000 | (D23) | 1.0 | |
| 24 | 36.8654 | 4.100 | 1.56384 | 60.69 |
| 25 | −33.6307 | 2.100 | 1.0 | |
| 26 | 40.3424 | 1.500 | 1.76182 | 26.52 |
| 27 | 22.6704 | 3.900 | 1.0 | |
| 28 | −1268.6439 | 5.450 | 1.59551 | 39.23 |
| 29 | −11.9507 | 1.100 | 1.83481 | 42.72 |
| 30 | −54.4637 | (Bf) | 1.0 | |

(Aspherical Data)
Surface Number 8
$\kappa = +4.6571$
$C_4 = +8.7915 \times 10^{-6}$
$C_6 = -1.0601 \times 10^{-8}$
$C_8 = +4.3226 \times 10^{-12}$
$C_{10} = +9.7295 \times 10^{-14}$
Surface Number 24
$\kappa = -0.4900$
$C_4 = -1.2005 \times 10^{-5}$
$C_6 = +2.5279 \times 10^{-8}$
$C_8 = +5.3759 \times 10^{-12}$
$C_{10} = +2.5849 \times 10^{-13}$ (Variable Intervals While Zooming)

| f | 28.8000 | 76.6109 | 193.9963 |
|---|---|---|---|
| D7 | 2.0274 | 22.0944 | 40.3311 |
| D1 | 21.9978 | 10.9580 | 2.0470 |
| D23 | 8.0239 | 4.5198 | 3.2920 |
| BF | 41.6802 | 67.0595 | 80.0571 |

(movement of the second lens group Δ2);
an imaging magnification is −1/30,
the movement to the object side is assumed to be positive.

| f | 28.8000 | 76.6109 | 193.9963 |
|---|---|---|---|
| Δ2 | 0.5962 | 0.6190 | 2.4044 |

(Values for the Conditional Expressions)
f2=−14.8502
(1) (r41−r42)/(r41+r42)=0.238
(2) D1/ft=0.208
(3) $|f2|/(fw \cdot ft)^{1/2}$=0.199
(4) d2/d1 =1.857

Figure 6A:
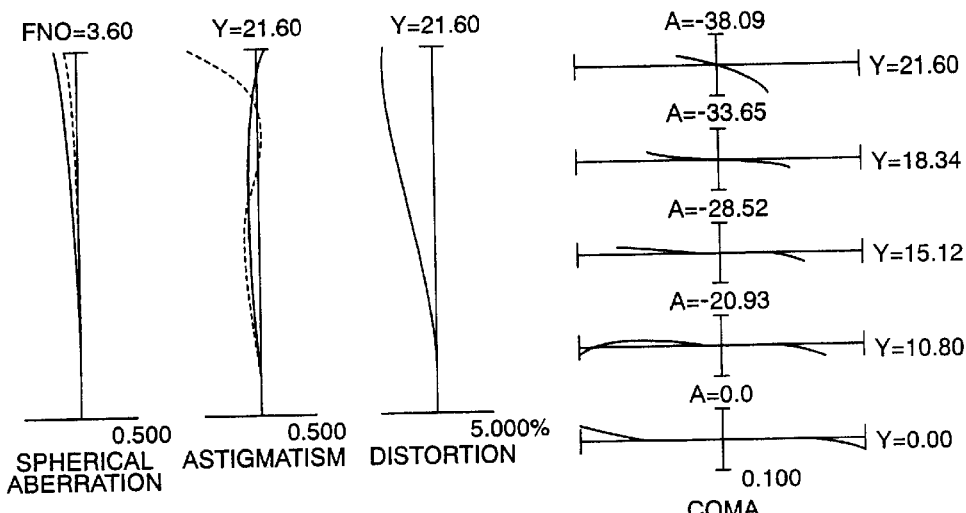
FIGS. 6A–6C are graphs showing various aberrations of Example 2 of the first embodiment in the wide-angle end state, the intermediate focal length state, and the telephoto end state, respectively when focusing at infinity.
Figure 6B:
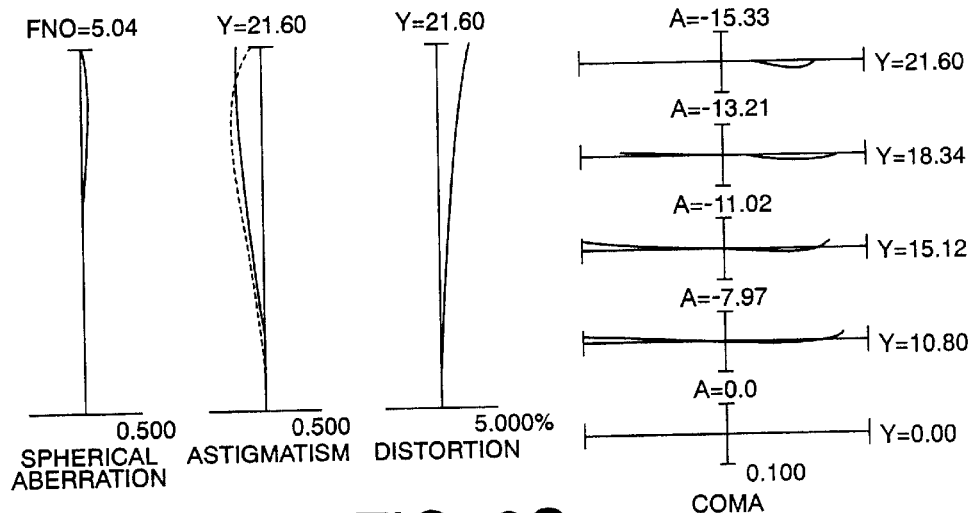
Figure 6C:
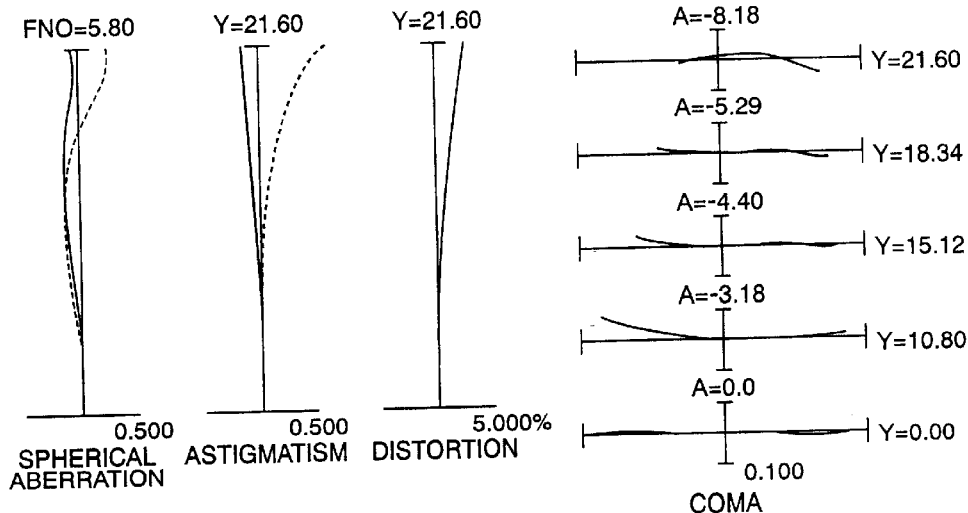

FIGS. 6A–6C are graphs showing various aberrations of Example 2 of the first embodiment in the wide-angle end state (f=28.80), the intermediate focal length state (f=76.61), and the telephoto end state (f=194.00), respectively when focusing at infinity.

Figure 7A:
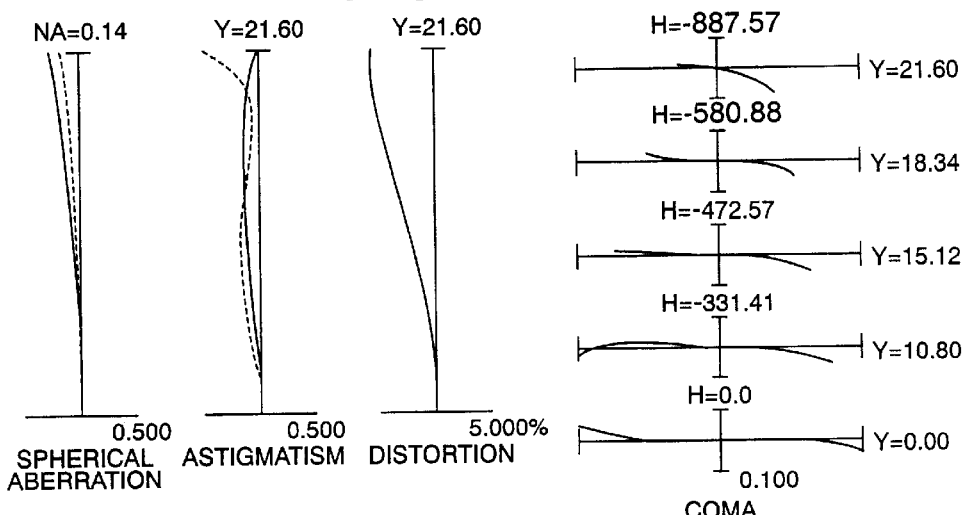
FIGS. 7A–7C are graphs showing various aberrations of Example 2 of the first embodiment in the wide-angle end state, the intermediate focal length state, and the telephoto end state, respectively when focusing at finite distant object.
Figure 7B:
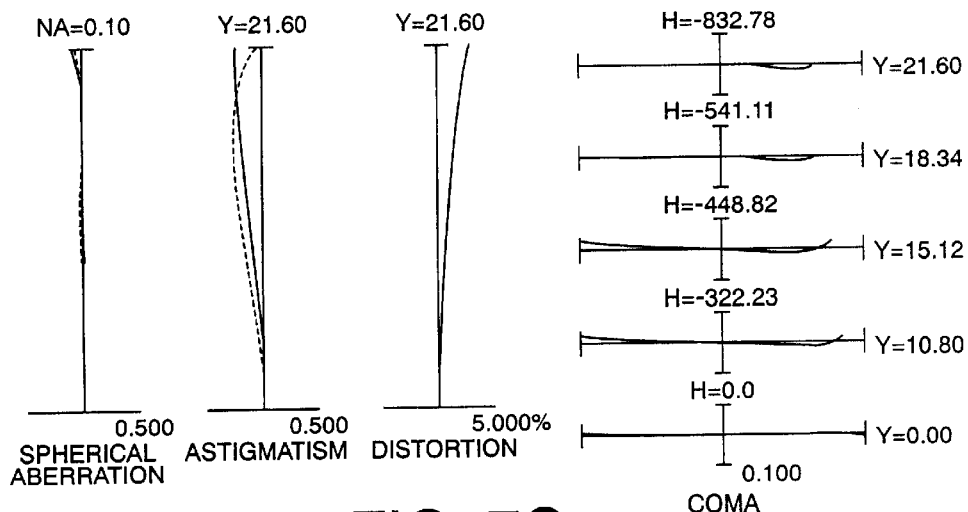
Figure 7C:
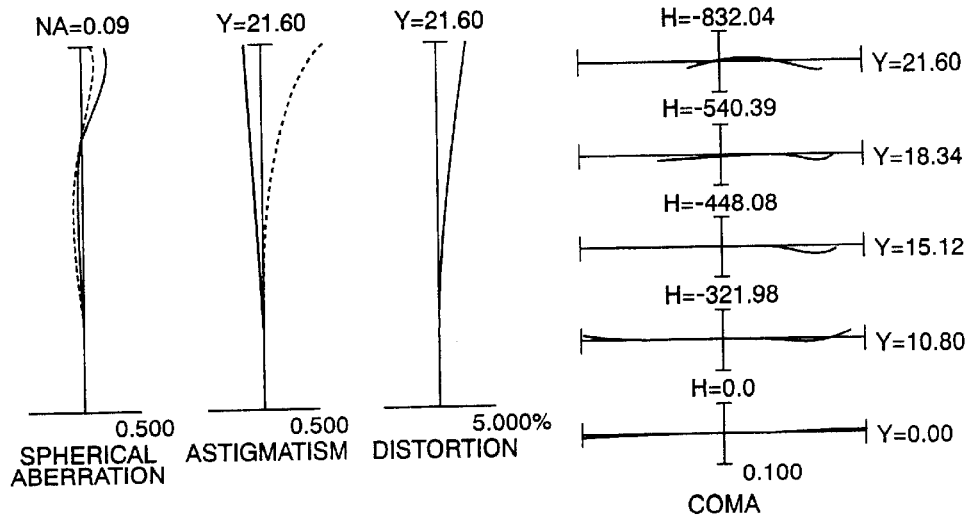

FIGS. 7A–7C are graphs showing various aberrations of Example 2 of the first embodiment in the wide-angle end state (f=28.80), the intermediate focal length state (f=76.61), and the telephoto end state (f=194.00), respectively when focusing at finite distant object (an imaging magnification is −1/30).

As is apparent from the respective graphs showing various aberrations, excellent compensation is made for various aberrations, and superior optical performance is obtained.

EXAMPLE 3

Figure 8:
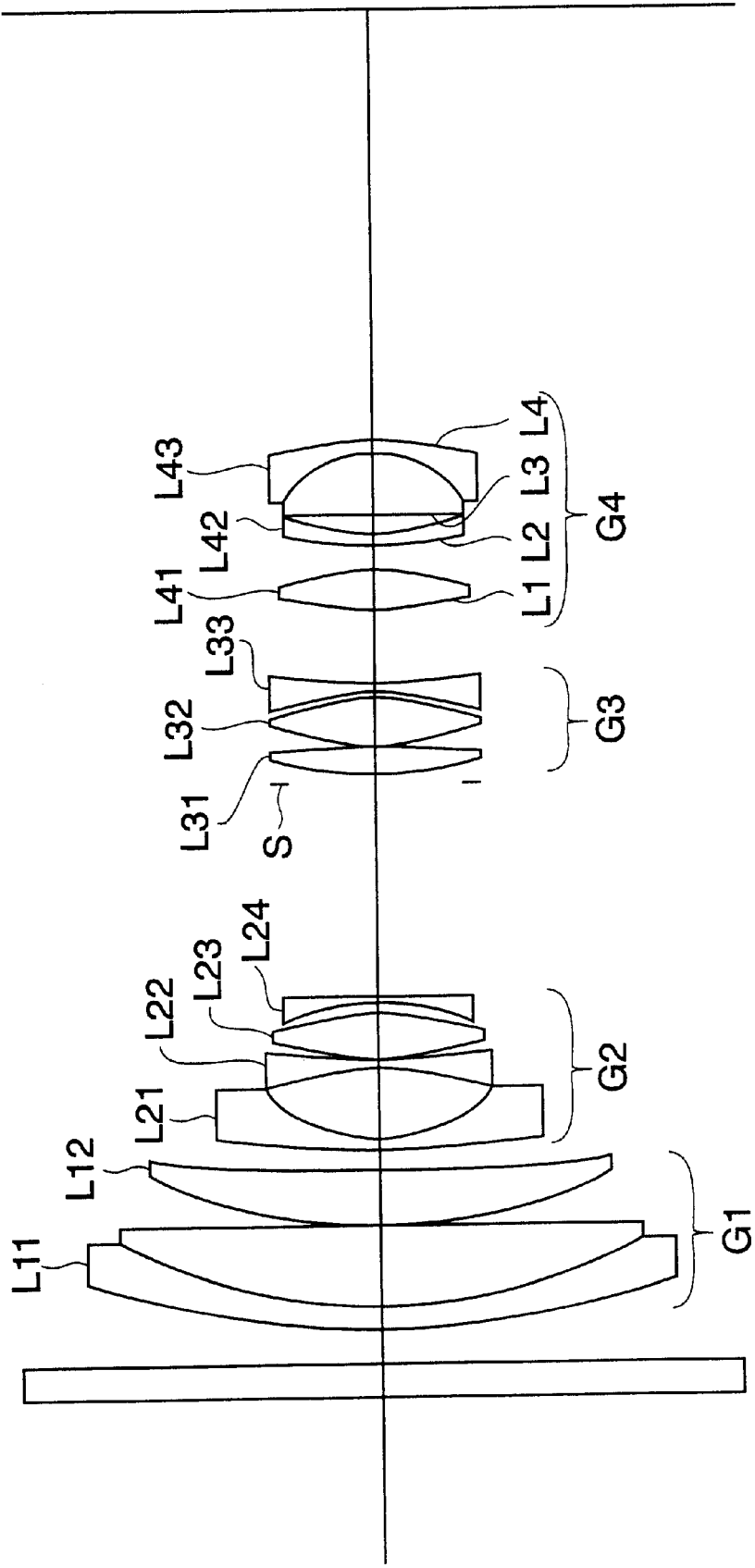
FIG. 8 is a sectional view schematically showing the configuration of a zoom lens system according to Example 3 of the first embodiment of the present, invention.

FIG. 8 is a sectional view schematically showing the configuration of a zoom lens system according to Example 3 of the first embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex lens L31, a double convex lens L32, and a negative lens L33 having a concave surface facing to the object side. A fourth lens group G4 is composed of a double convex lens L41 (=L1), a negative meniscus lens L42 (=L2) having a convex surface facing to the object side, and a cemented lens L43 constructed by a positive lens element L3 having a convex surface facing to the image side cemented with a negative lens element L4 having a concave surface facing to the object side.

In Example 3, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface.

Various values associated with Example 3 are listed in Table 3.

TABLE 3

(Specifications)

f: 28.80~77.59~194.00
FNO: 3.47~4.95~5.80
2ω: 76.16°~31.16°~12.36°

(Lens Data)

|    | r          | d       | n       | v             |
|----|------------|---------|---------|---------------|
| 1  | 0.0000     | 3.000   | 1.51680 | 64.20         |
| 2  | 0.0000     | 3.870   | 1.0     |               |
| 3  | 100.6126   | 2.000   | 1.84666 | 23.78         |
| 4  | 54.9492    | 7.850   | 1.60300 | 65.47         |
| 5  | 438.4086   | 0.150   | 1.0     |               |
| 6  | 54.3867    | 5.550   | 1.71300 | 53.85         |
| 7  | 195.1841   | (D7)    | 1.0     |               |
| 8  | 123.6677   | 0.120   | 1.52020 | 52.02         |
| 9  | 80.1698    | 1.000   | 1.81600 | 46.64         |
| 10 | 15.9654    | 6.850   | 1.0     |               |
| 11 | −38.9534   | 0.900   | 1.80400 | 46.58         |
| 12 | 84.4171    | 0.200   | 1.0     |               |
| 13 | 35.3698    | 4.250   | 1.84666 | 23.78         |
| 14 | −43.4656   | 1.150   | 1.0     |               |
| 15 | −24.9145   | 0.900   | 1.75500 | 52.32         |
| 16 | 0.0000     | (D16)   | 1.0     |               |
| 17 | 0.0000     | 1.000   | 1.0     | aperture stop |
| 18 | 29.7076    | 2.950   | 1.65160 | 58.54         |
| 19 | −557.5170  | 0.100   | 1.0     |               |
| 20 | 26.6061    | 4.700   | 1.49700 | 81.61         |
| 21 | −32.2561   | 0.400   | 1.0     |               |
| 22 | −27.8761   | 0.900   | 1.83400 | 37.17         |
| 23 | 100.0000   | (D23)   | 1.0     |               |
| 24 | 48.0246    | 4.050   | 1.56384 | 60.69         |
| 25 | −26.9960   | 2.450   | 1.0     |               |
| 26 | 39.9652    | 2.000   | 1.76182 | 26.52         |
| 27 | 24.1428    | 2.100   | 1.0     |               |
| 28 | −290.5654  | 5.600   | 1.64980 | 34.47         |
| 29 | −11.4435   | 1.100   | 1.83400 | 37.17         |
| 30 | −79.3446   | (Bf)    | 1.0     |               |

(Aspherical Data)

Surface Number 8

$\kappa = +0.1599$
$C_4 = +7.1048 \times 10^{-6}$
$C_6 = -4.5159 \times 10^{-9}$
$C_8 = -1.8628 \times 10^{-11}$
$C_{10} = +1.6804 \times 10^{-13}$ Surface Number 24

$\kappa = -4.1307$
$C_4 - 1.7339 \times 10^{-5}$
$C_6 = +2.3805 \times 10^{-9}$
$C_8 = +6.2072 \times 10^{-11}$
$C_{10} = +1.2363 \times 10^{-13}$ (Variable Intervals While Zooming)

| f   | 28.7995 | 75.5855 | 193.9921 |
|-----|---------|---------|----------|
| D7  | 2.0374  | 21.2465 | 40.1667  |
| D   | 21.6663 | 10.7649 | 2.0470   |
| D23 | 7.4245  | 4.3856  | 3.2920   |
| BF  | 40.6565 | 75.5855 | 193.9921 |

(movement of the second lens group Δ2);

an imaging magnification is −1/30, the movement to the object side is assumed to be positive.

| f  | 28.7005 | 75.5855 | 193.9921 |
|----|---------|---------|----------|
| Δ2 | 0.6058  | 0.5883  | 1.9624   |

(Values for the Conditional Expressions)

f2=−15.0073

(1) (r41−r42)/(r41+r42)=0.331
(2) D1/ft=0.207
(3) $|f2|/(fw \cdot ft)^{1/2}$=0.201
(4) d2/d1=0.857

FIGS. 9A–9C are graphs showing various aberrations of Example 3 of the first embodiment in the wide-angle end state (f=28.80), the intermediate focal length state (f=75.59), and the telephoto end state (f=194.00), respectively when focusing at infinity.

Figure 10A:
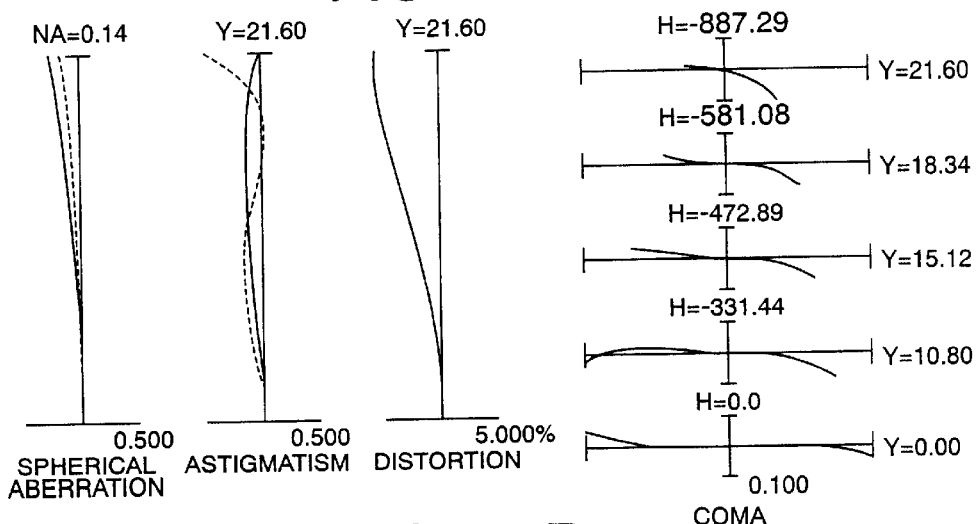
FIGS. 10A–10C are graphs showing various aberrations of Example 3 of the first embodiment in the wide-angle end state, the intermediate focal length state, and the telephoto end state, respectively when focusing at finite distant object.
Figure 10B:
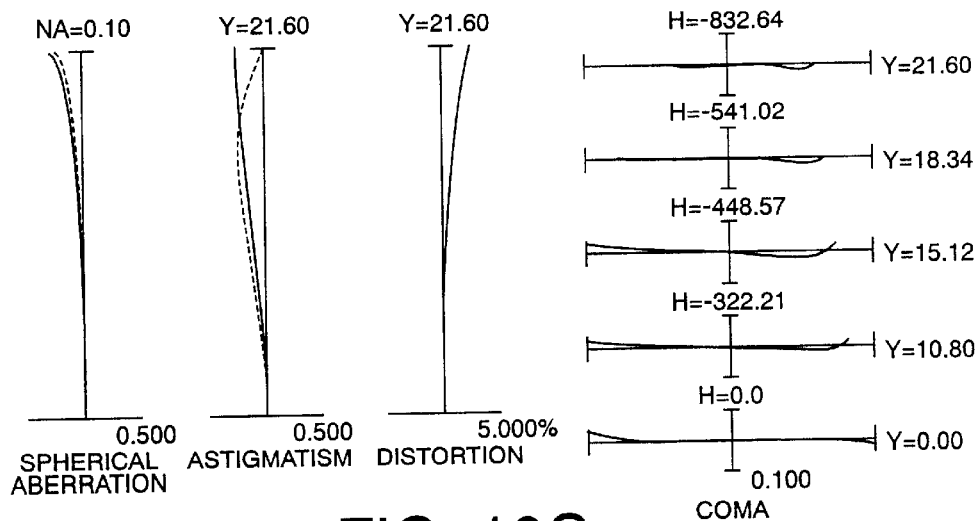
Figure 10C:
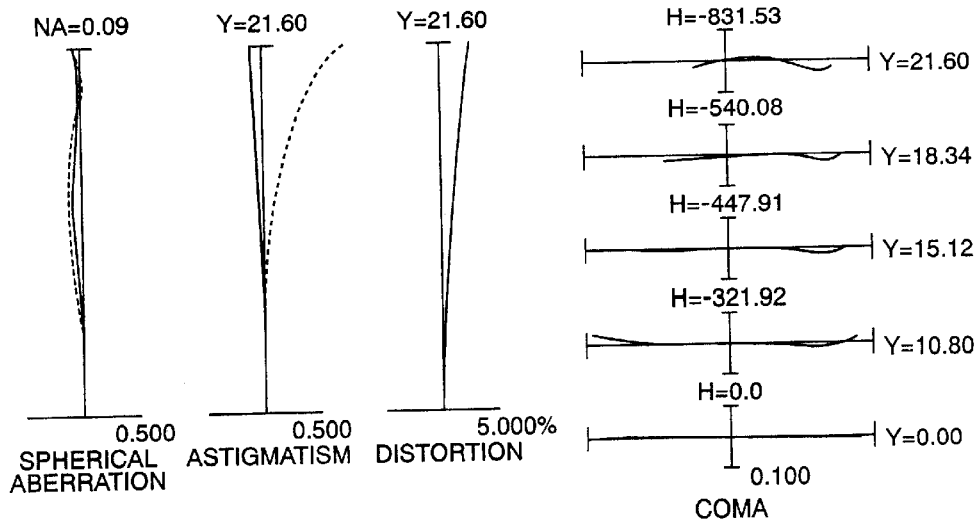

FIGS. 10A–10C are graphs showing various aberrations of Example 3 of the first embodiment in the wide-angle end state (f=28.80), the intermediate focal length state (f=75.59), and the telephoto end state (f=194.00), respectively when focusing at finite distant object (an imaging magnification is −1/30).

As is apparent from the respective graphs showing various aberrations, excellent compensation is made for various aberrations, and superior optical performance is obtained.

EXAMPLE 4

Figure 11:
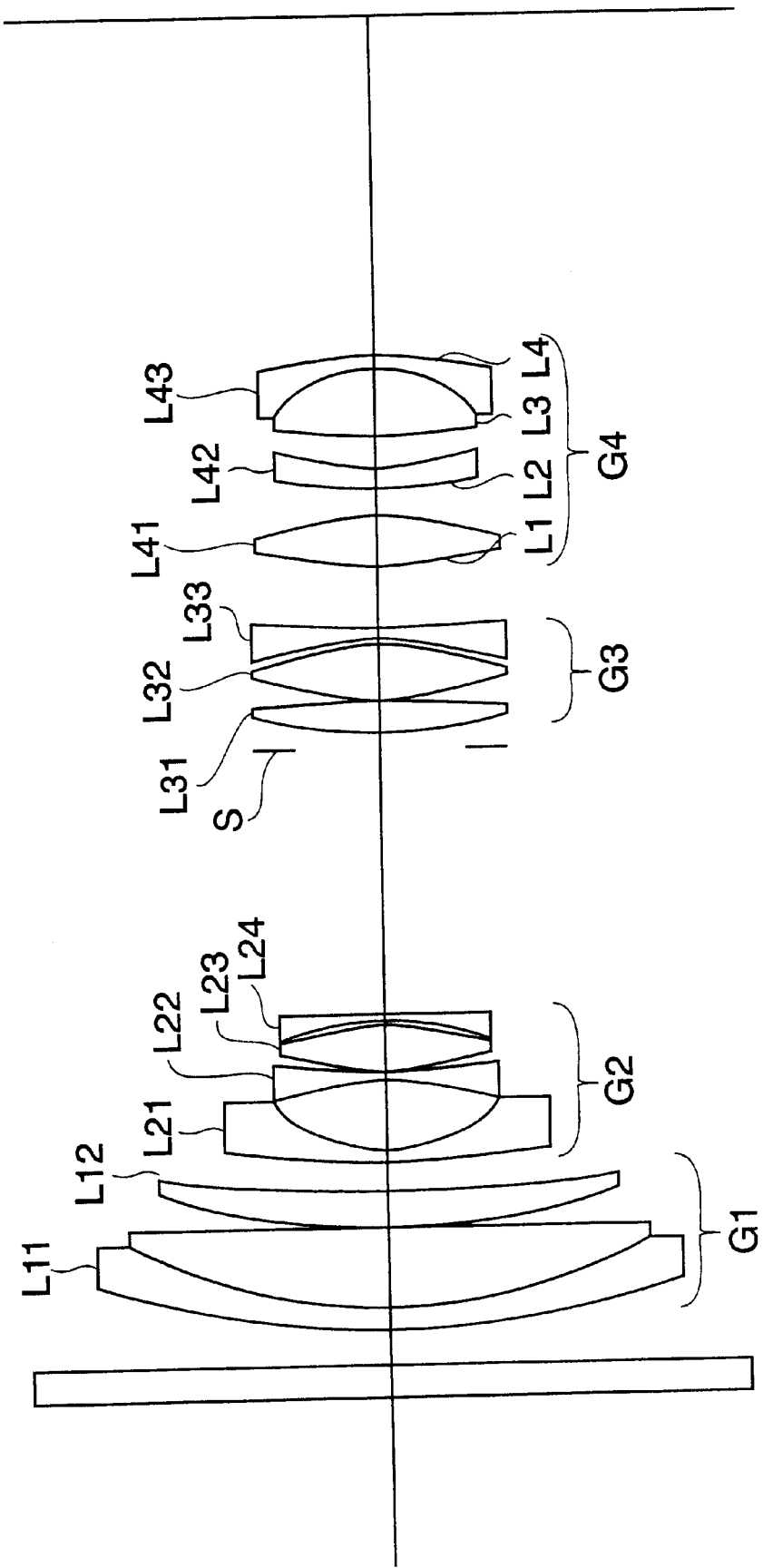
FIG. 11 is a sectional view schematically showing the configuration of a zoom lens system according to Example 4 of the first embodiment of the present invention.

FIG. 11 is a sectional view schematically showing the configuration of a zoom lens system according to Example 4 of the first embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex lens L31, a double convex lens L32, and a negative lens L33 having a concave surface facing to the object side. A fourth lens group G4 is composed of a double convex lens L41 (=L1), a negative meniscus lens L42 (=L2) having a convex surface facing to the object side, and a cemented lens L43 constructed by a positive lens element L3 having a convex surface facing to the image side cemented with a negative lens element L4 having a concave surface facing to the object side.

In Example 4, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface. Various values associated with Example 4 are listed in Table 4.

TABLE 4

(Specifications)

f: 28.80~84.59~291.00
FNO: 3.70~4.98~5.80
2ω: 76.03°~27.72°~8.27°

(Lens Data)

| | r | d | n | ν |
|---|---|---|---|---|
| 1 | 0.0000 | 3.000 | 1.51680 | 64.20 |
| 2 | 0.0000 | 3.870 | 1.0 | |
| 3 | 88.1069 | 2.100 | 1.84666 | 23.78 |
| 4 | 60.2091 | 8.650 | 1.60300 | 65.47 |
| 5 | −7599.3615 | 0.100 | 1.0 | |
| 6 | 70.5877 | 3.650 | 1.49700 | 81.61 |
| 7 | 152.8294 | (D7) | 1.0 | |
| 8 | 128.8767 | 0.300 | 1.55281 | 37.63 |
| 9 | 117.8333 | 1.600 | 1.83481 | 42.72 |
| 10 | 17.9048 | 6.200 | 1.0 | |
| 11 | −39.5006 | 1.000 | 1.80400 | 46.58 |
| 12 | 98.1734 | 0.100 | 1.0 | |
| 13 | 39.7284 | 4.500 | 1.84666 | 23.78 |
| 14 | −42.0261 | 1.050 | 1.0 | |
| 15 | −25.4767 | 1.000 | 1.75500 | 52.32 |
| 16 | −287.9484 | (D16) | 1.0 | |
| 17 | 0.0000 | 1.000 | 1.0 | aperture stop |
| 18 | 32.3616 | 4.200 | 1.60300 | 65.47 |
| 19 | −331.8602 | 0.100 | 1.0 | |
| 20 | 31.0120 | 5.450 | 1.49700 | 81.61 |
| 21 | −66.6030 | 1.000 | 1.0 | |
| 22 | −38.6691 | 1.000 | 1.80610 | 33.27 |
| 23 | 100.0000 | (D23) | 1.0 | |
| 24 | 32.1961 | 5.800 | 1.58913 | 61.18 |
| 25 | −40.6126 | 2.850 | 1.0 | |
| 26 | 56.0104 | 2.050 | 1.83481 | 42.72 |
| 27 | 21.8451 | 3.550 | 1.0 | |
| 28 | 59.6688 | 7.200 | 1.58144 | 40.75 |
| 29 | −13.3333 | 1.000 | 1.83481 | 42.72 |
| 30 | −83.1316 | (Bf) | 1.0 | |

(Aspherical Data)
Surface Number 8
$\kappa = +11.0000$
$C_4 = +3.4170 \times 10^{-6}$
$C_6 = +2.4418 \times 10^{-9}$
$C_8 = -3.5111 \times 10^{-11}$
$C_{10} = +1.7907 \times 10^{-13}$
Surface Number 24
$\kappa = -5.7212$
$C_4 = +1.0672 \times 10^{-5}$
$C_6 = -4.7687 \times 10^{-8}$
$C_8 = +1.6611 \times 10^{-10}$
$C_{10} = -2.3360 \times 10^{-13}$ (Variable Intervals While Zooming)

| f | 28.8002 | 84.5854 | 291.0114 |
|---|---|---|---|
| D7 | 3.1536 | 29.5383 | 58.1569 |
| D16 | 29.1283 | 14.9051 | 2.4000 |
| D23 | 6.3125 | 2.3106 | 1.0000 |
| BF | 39.2561 | 71.0977 | 97.9981 |

(movement of the second lens group Δ2);
an imaging magnification is −1/30,
the movement to the object side is assumed to be positive.

| f | 28.8002 | 84.5854 | 291.0114 |
|---|---|---|---|
| Δ2 | 0.7222 | 0.6321 | 2.5507 |

(Values for the Conditional Expressions)
f2=−17.2290
(1) (r41−r42)/(r41+r42)=0.192
(2) D1/ft=0.207
(3) |f2|/(fw·ft)$^{1/2}$=0.188
(4) d2/d1=1.246

Figure 12A:
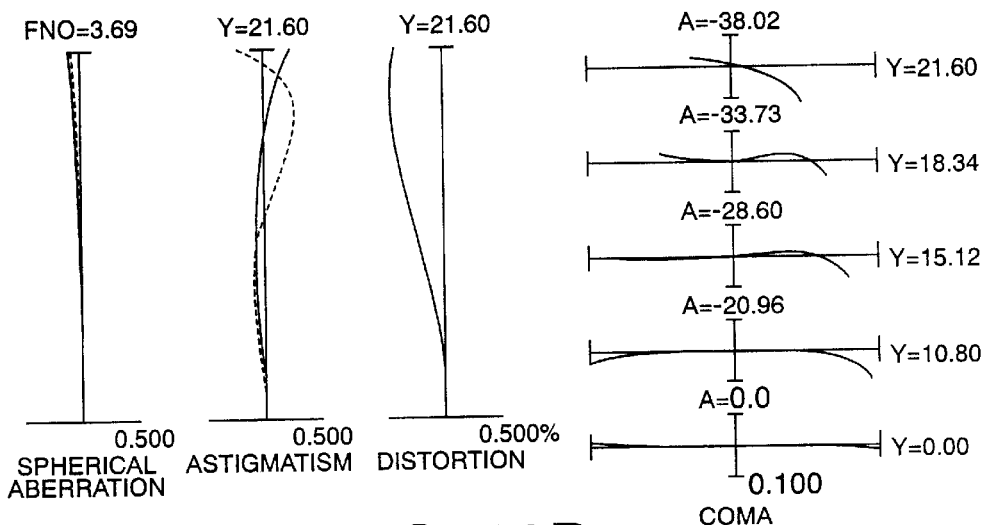
FIGS. 12A–12C are graphs showing various aberrations of Example 4 of the first embodiment in the wide-angle end state, the intermediate focal length state, and the telephoto end state, respectively when focusing at infinity.
Figure 12B:
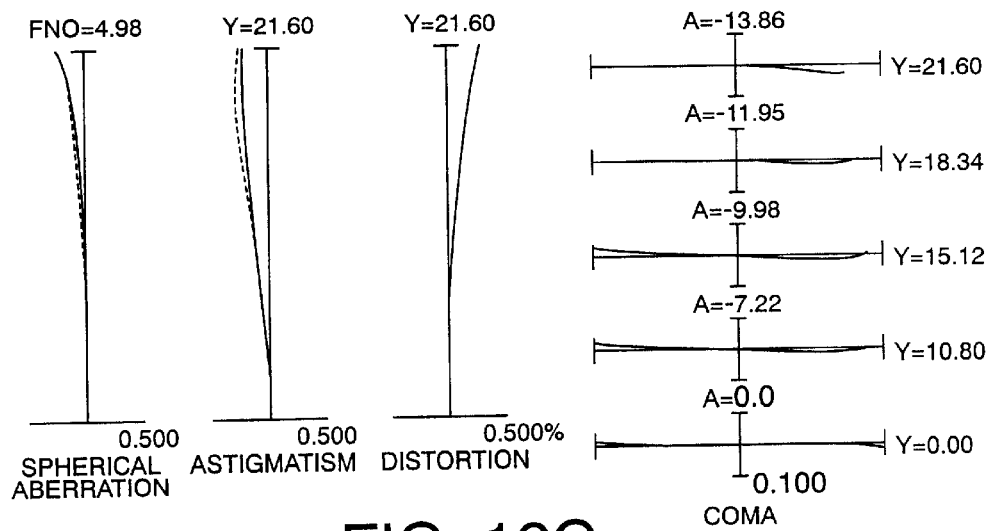
Figure 12C:
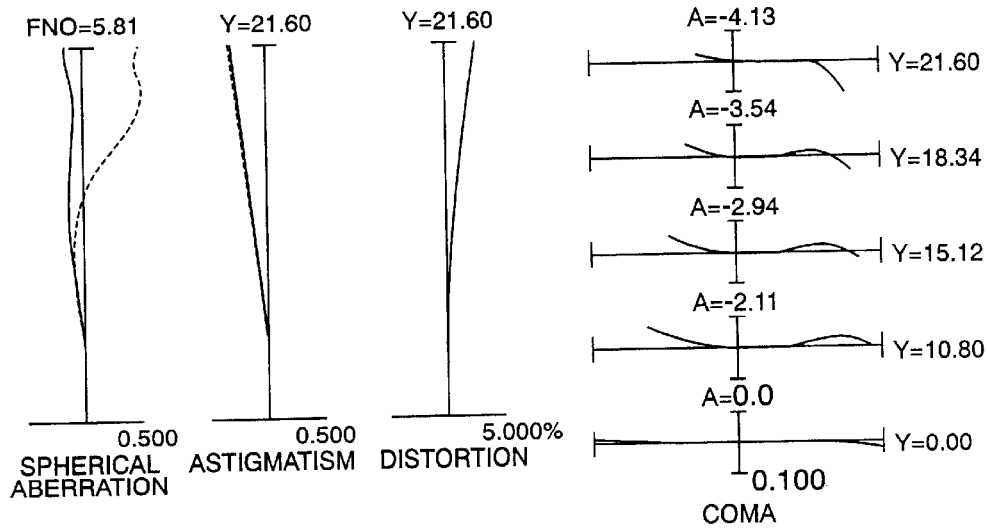

FIGS. 12A–12C are graphs showing various aberrations of Example 4 of the first embodiment in the wide-angle end state (f=28.80), the intermediate focal length state (f=85.59), and the telephoto end state (f=291.00), respectively when focusing at infinity.

Figure 13A:
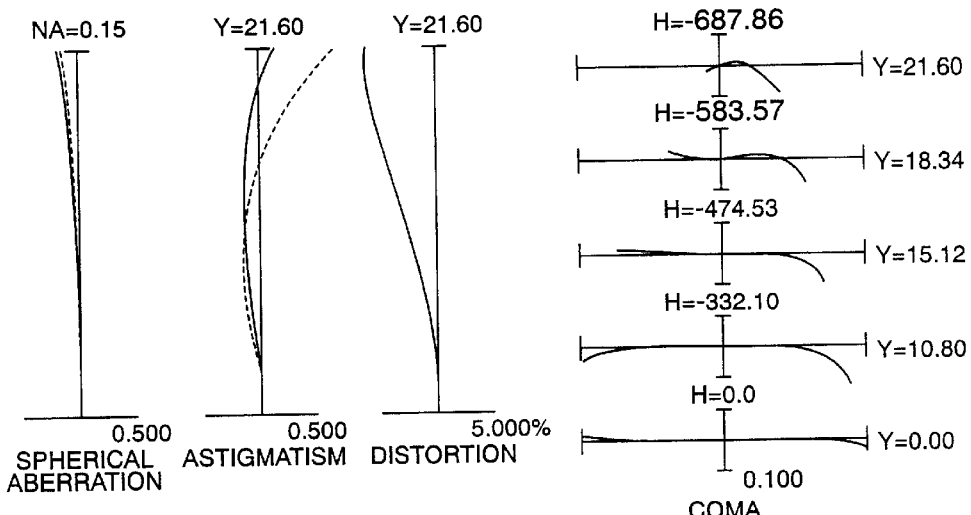
FIGS. 13A–13C are graphs showing various aberrations of Example 4 of the first embodiment in the wide-angle end state, the intermediate focal length state, and the telephoto end state, respectively when focusing at finite distant object.
Figure 13B:
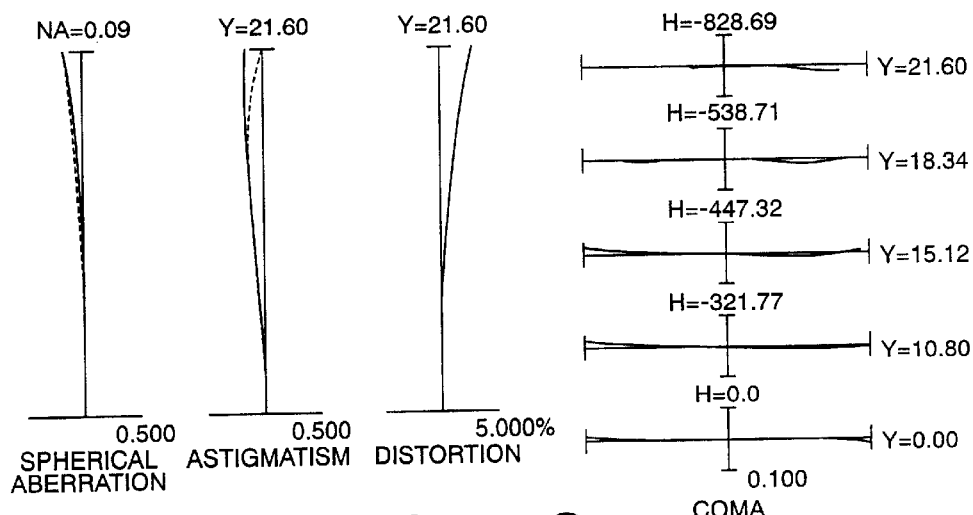
Figure 13C:
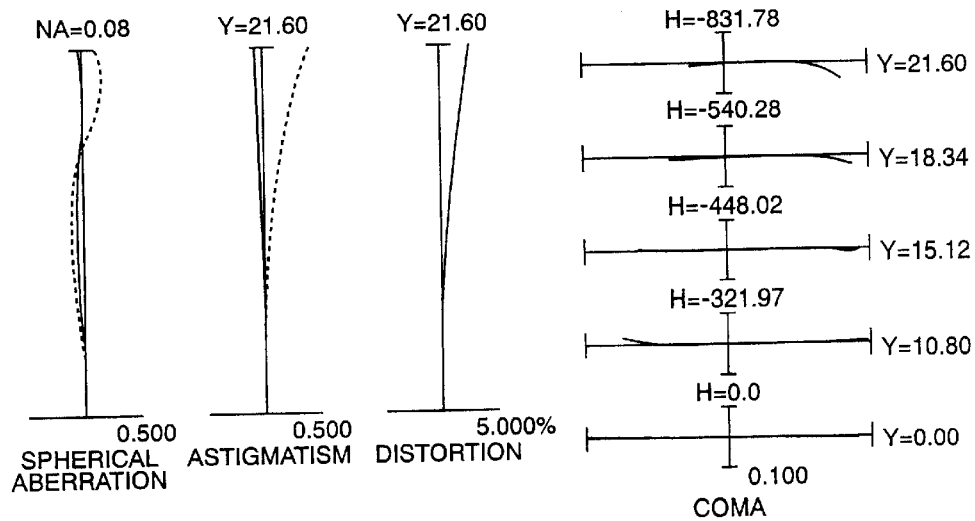

FIGS. 13A–13C are graphs showing various aberrations of Example 4 of the first embodiment in the wide-angle end state (f=28.80), the intermediate focal length state (f=85.59), and the telephoto end state (f=291.00), respectively when focusing at finite distant object (an imaging magnification is −1/30).

As is apparent from the respective graphs showing various aberrations, excellent compensation is made for various aberrations, and superior optical performance is obtained.

<Second Embodiment>

In the second embodiment of the present invention, since the lateral magnification of the second lens group varies largely when the state of lens group positions changes from the wide-angle end state to the telephoto end state, the refractive power of the second lens group is weaken, the lens configuration of the lens group is simplified, and the movement of the lens group is increased instead.

In the second embodiment, the second lens group is composed of, in order from the object, a negative meniscus lens having a concave surface facing to the image side, a double concave negative lens, a double convex positive lens, and a negative lens having a concave surface facing to the object side. The thickness of the second lens group can be thinned by constructing the second lens group as described above. In the second lens group, the negative lens located to the most object side mainly corrects off-axis aberrations, and the three lenses locating to the image side of the negative lens mainly correct on-axis aberrations by forming a triplet lens having negative refractive power.

Each conditional expressions are explained below.

In the second embodiment, it is desirable for the second lens group to be constructed with satisfying the following conditional expressions (5) and (6):

$$3 < |f2B|/|f2| < 5 \quad (5)$$

$$0.33 < f2P/|f2B| < 0.45 \quad (6)$$

where f2B denotes the focal length of the three lenses (the triplet lens described above) locating to the image side of the second lens group composed of four lenses, f2 denotes the focal length of the second lens group, and f2P denotes the focal length of the double convex lens locating in the second lens group.

Conditional expression (5) defines the focal length of the triplet lens having negative refractive power in the second lens group.

When the ratio |f2B|/|f2| exceeds the upper limit of conditional expression (5), the refractive power of the negative lens located to the most object side of the second lens group becomes strong in the negative direction, so that off-axis ray passing through the negative lens passes near to the optical axis and, as a result, off-axis aberrations cannot be corrected well. On the other hand, when the ratio falls below the lower limit of conditional expression (5), the refractive power of the triplet lens in the second lens group becomes strong, so that positive spherical aberration is produced largely and, as a result, predetermined optical performance cannot be obtained.

Conditional expression (6) defines the refractive power of the positive lens in the triplet lens.

Since the positive lens is the only positive lens locating in the second lens group, when the ratio f2P/|f2B| exceeds the upper limit of conditional expression (6), the refractive power of the positive lens becomes weak, so that the positive spherical aberration produced in the second lens group cannot be corrected well. On the other hand, when the ratio falls below the lower limit of conditional expression (6), the refractive power of the negative lenses composing the second lens group becomes strong in the negative direction because the refractive power of the positive lens becomes strong in the positive direction, so that high order spherical aberration is produced. Moreover, since degradation of optical performance caused by mutual decentering produced while manufacturing becomes large, stable optical performance of the product cannot be maintained. Accordingly, it is important to lower the upper limit and to exceed the lower limit of conditional expression (6).

In the second embodiment, in order to balance shortening of the total lens length with miniaturizing of the lens diameter, it is desirable to satisfy the following conditional expression (7):

$$0.14 < |f2|/(fw \cdot ft)^{1/2} < 0.24 \quad (7)$$

where fw denotes the focal length of the zoom lens system as a whole in the wide-angle end state, and ft denotes the focal length of the zoom lens system as a whole in the telephoto end state.

Conditional expression (7) defines the focal length of the second lens group.

When the ratio $|f2|/(fw \cdot ft)^{1/2}$ exceeds the upper limit of conditional expression (7), off-axis ray passing through the first and second lens groups passes away from the optical axis in the wide-angle end state, so that the lens diameter becomes large. On the other hand, when the ratio falls below the lower limit of conditional expression (7), divergent effect of the second lens group becomes strong, so that the total lens length in the telephoto end state becomes large. In either case, the lens system cannot be sufficiently made compact.

In addition, when the lower limit of conditional expression (7) is set to 0.16, more desirable optical performance of the present embodiment can be expected. Because when the refractive power of the second lens group becomes strong in the negative direction, it becomes necessary to well correct the positive spherical aberration produced in the second lens group.

In the present embodiment, in order to miniaturize the lens diameter, it is desirable to arrange an aperture stop between the second lens group and the third lens group. Moreover, it is desirable that the aperture stop is moved with the third lens group in a body when the state of lens group positions changes from the wide-angle end state to the telephoto end state. Thus, by moving the aperture stop with the third lens group in a body, variation in off-axis aberrations produced while changing the state of lens group positions can be corrected well.

In a zoom lens system having a high zoom ratio, it is generally desirable to arrange an aperture stop in the vicinity of the center of the lens system. This is because it is desirable that at least one lens group whose separation from the aperture stop is variable is arranged to each of the object and image sides of the aperture stop. Moreover, it is desirable to arrange the aperture stop in the vicinity of the center of the lens system since the lens diameter is liable to become large because off-axis ray passing through the lens group locating away from the aperture stop passes away from the optical axis.

Accordingly, in the present embodiment, it is ideal for balancing high optical performance with compactness to arrange the aperture stop between the second lens group and the third lens group. Furthermore, the construction of the lens barrel can be simplified by moving the aperture stop with the third lens group in a body while changing the state of lens group positions.

In the present embodiment, in order to obtain good optical performance, it is desirable for the first lens group to be composed of at least three lenses which are arranged, in order from the object, a negative meniscus lens having a convex surface facing to the object side, a first positive lens having a convex surface facing to the object side, and a second positive lens having a convex surface facing to the object side, and the following conditional expression (8) is desirably satisfied:

$$2 < f13/f1 < 4 \quad (8)$$

where f13 denotes the focal length of the second positive lens arranged in the first lens group and f1 denotes the focal length of the first lens group.

Conditional expression (8) defines the focal length of the second positive lens in the first lens group and the position of the principal point of the first lens group. The nearer the image side principal point of the first lens group exists to the object side relative to the lens group, the wider the separation of the image side principal point of first lens group to the principal point of the second group becomes. Therefore, since off-axis ray passing through the first lens group passes away from the optical axis in the wide-angle state, correction of coma becomes insufficient as approaching from the center to the periphery of the image.

The existence of the image side principal point to the object side relative to the lens group means, in other words, that the focal length of the positive lens is large. When the ratio f13/f1 exceeds the upper limit of conditional expression (8), the defect described above is happened. On the other hand, when the ratio falls below the lower limit of conditional expression (8), since the image side principal point of the first lens group moves to the image side, off-axis ray passing through the first lens group passes near to the optical axis in the wide-angle end state, so that production of coma can be suppressed. However, since negative spherical aberration produced in the second lens group becomes large, optical performance at the center is degraded by negative spherical aberration produced particularly in the telephoto end state.

In the present embodiment as described above, in order to achieve a high zoom ratio without increasing refractive power of each lens group as much as possible, each lens group is thinned. In order to thin each lens group as much as possible, it is desirable that the negative lens and the first positive lens of which the first lens group is composed, are cemented. To cement these lenses makes it possible to prevent degradation of optical performance caused by mutual decentering between the negative lens and the first positive lens, so that stable manufacturing quality can be expected.

Moreover, the third lens group can be thinned by being composed of, in order from the object, a first positive lens having a convex surface facing to the object side, a second positive lens having a convex surface facing to the object side, and a negative lens having a concave surface facing to the object side. In order to converge light flux diverged by the second lens group, the third lens group, in particular, has strong refractive power. Accordingly, it is desirable to construct the third lens group with two positive lenses and a negative lens locating to the image side of the positive lenses in order to shorten the total lens length.

In the present embodiment, in order to well correct variation in off-axis aberrations produced while changing the state of lens group positions, it is desirable to satisfy the following conditional expression (9):

$$0.45 < D2W/D1T < 0.60 \quad (9)$$

where D2W denotes the separation along the optical axis between the second lens group and the third lens group in the wide-angle end state, and D1T denotes the separation along the optical axis between the first lens group and the second lens group in the telephoto end state.

Conditional expression (9) defines the separation between the first lens group and the second lens group, and the separation between the second lens group and the third lens group.

In order to correct well off-axis aberrations produced while changing the state of lens group positions, it is important for a height of off-axis ray passing through each lens group to be changed actively. In the present embodiment, the first lens group and the second lens group are located near with each other and located away from the aperture stop in the wide-angle end state, so that off-axis ray passing through the second lens group passes away from the optical axis and off-axis ray passing through the first lens group passes the optical axis as near as possible. When the state of lens group positions changes to the telephoto end state, the separation between the first lens group and the second lens group increases and the separation between the second lens group and the third lens group decreases, so that off-axis ray passing through the first lens group passes away from the optical axis and off-axis ray passing through the second lens group passes near to the optical axis.

In the present embodiment, variation in off-axis aberrations produced while changing the state of lens group positions is corrected by actively varying the heights of off-axis rays passing through the first and second lens groups. Off-axis aberrations are corrected by the second lens group particularly in the wide-angle end state and by the first lens group in the telephoto end state.

When the ratio D2W/D1T exceeds the upper limit of conditional expression (9), off-axis aberrations in the telephoto end state cannot be corrected well. On the other hand, when the ratio falls below the lower limit of conditional expression (9), off-axis aberrations in the wide-angle end state cannot be corrected well.

In the above described present embodiment, it is desirable to employ an aspherical surface to the most object side lens surface of the second lens group.

In the present embodiment, since the refractive power of the second lens group becomes weak, off-axis ray incident to the second lens group tends to pass away from the optical axis. Accordingly, it is convenient to correct on-axis aberrations and off-axis aberrations separately. However, it is more suitable to employ an aspherical surface to the most object side lens surface of the second lens group in order to obtain better optical performance in the wide-angle end state. In addition, it is desirable to employ an aspherical surface to the most object side positive lens in the fourth lens group.

In the present embodiment, off-axis ray passing through the fourth lens group in the wide-angle end state tends to pass away from the optical axis. Accordingly, a ray passing through the periphery of the positive lens tends to be converged excessively, so that correction of coma tends to be insufficient in the periphery of the image plane. To improve optical performance in the periphery of the image plane in the wide-angle end state, it is desirable to employ an aspherical surface to the most object side positive lens in the fourth lens group.

It is more preferable to arrange an aspherical surface lens in each of the second and fourth lens groups.

Moreover, in the present invention, in order to suppress variation in various aberrations, it is preferable to move the second lens group along the optical axis while focusing at near object.

Numerical examples according to the second embodiment is explained below with reference to accompanying drawings.

In each example, an aspherical surface is expressed by the following expression:

$$x = cy^2/\{1+(1-\kappa c^2 y^2)^{1/2}\} + C_4 y^4 + C_6 y^6 + \ldots$$

where y denotes the height in a vertical direction relative to the optical axis, x denotes displacement in the optical axis direction at the height y (a sag amount), c denotes a reference radius of curvature, $\kappa$ denotes the conical coefficient, and $C_4$, $C_6$, ... denote aspherical coefficients of respective orders 4, 6, ...

FIG. 1A is a diagram showing a distribution of refractive power in a zoom lens system according to each example of the second embodiment, together with the movement of each lens group during zooming. The zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, at least the first lens group G1 and the fourth lens group G4 are moved to the object direction such that the separation between the first lens group G1 and the second lens group G2 increases, the separation between the second lens group G2 and the third lens group G3 decreases, and the separation between the third lens group G3 and the fourth lens group G4 decreases.

EXAMPLE 5

Figure 14:
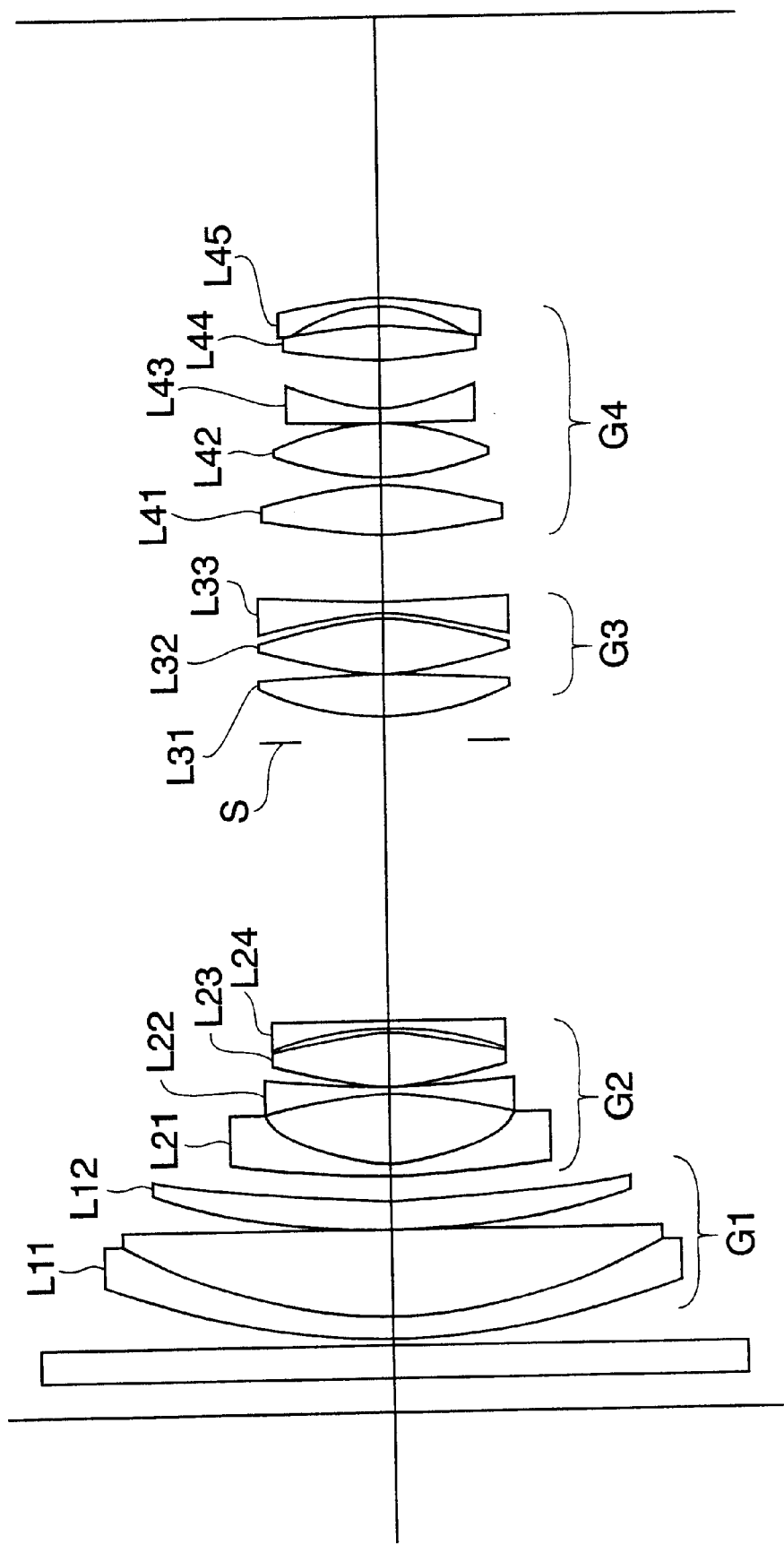
FIG. 14 is a sectional view schematically showing the configuration of a zoom lens system according to Example 5 of a second embodiment of the present invention.

FIG. 14 is a sectional view schematically showing the configuration of a zoom lens system according to Example 5 of the second embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex positive lens L31, a double convex positive lens L32, and a negative lens L33 having a concave surface facing to the object side. A fourth lens group G4 is composed of a double convex positive lens L41, a double convex positive lens L42, a double concave negative lens L43, a double convex positive lens L44, and a negative lens L45 having a concave surface facing to the object side.

In Example 5, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface.

Various values associated with Example 5 are listed in Table 5. In Table 5, f denotes the focal length, FNO denotes the f-number, 2ω denotes an angle of view. The refractive index is a value at d-line (λ=587.6 nm). In Table 5, the radius of curvature of a plane is denoted by 0.

By the way, in all Examples according to the second embodiment, the same symbols of this Example are used.

TABLE 5

(Specifications)

f: 28.80~106.38~291.00
FNO: 3.70~5.40~5.80
2ω: 76.09°~22.34°~8.29°

(Lens Data)

| | r | d | n | ν |
|---|---|---|---|---|
| 1 | 0.0000 | 3.000 | 1.51680 | 64.20 |
| 2 | 0.0000 | 3.870 | 1.0 | |
| 3 | 82.6070 | 2.100 | 1.84666 | 23.78 |
| 4 | 56.4023 | 8.450 | 1.603.00 | 65.47 |
| 5 | −7120.6767 | 0.100 | 1.0 | |
| 6 | 75.0520 | 3.100 | 1.72916 | 65.47 |
| 7 | 107.6642 | (D7) | 1.0 | |
| 8 | 90.1398 | 0.300 | 1.55281 | 37.63 |
| 9 | 82.3807 | 1.600 | 1.83481 | 42.72 |
| 10 | 18.8782 | 7.700 | 1.0 | |
| 11 | −41.9426 | 1.100 | 1.80400 | 46.58 |
| 12 | 90.3875 | 0.100 | 1.0 | |
| 13 | 40.9274 | 4.900 | 1.84666 | 23.78 |
| 14 | −44.5214 | 1.050 | 1.0 | |
| 15 | −27.2319 | 1.000 | 1.75500 | 52.32 |
| 16 | 20000.0000 | (D16) | 1.0 | |
| 17 | 0.0000 | 1.000 | 1.0 | aperture stop |
| 18 | 32.8316 | 4.100 | 1.6220 | 57.03 |
| 19 | −179.3251 | 0.100 | 1.0 | |
| 20 | 38.0527 | 5.500 | 1.49782 | 82.52 |
| 21 | −36.2871 | 0.350 | 1.0 | |
| 22 | −32.1271 | 1.000 | 1.83400 | 37.17 |
| 23 | 80.4971 | (D23) | 1.0 | |
| 24 | 35.0323 | 4.550 | 1.56384 | 60.69 |
| 25 | −58.7923 | 1.200 | 1.0 | |
| 26 | 37.7229 | 5.600 | 1.48749 | 70.45 |
| 27 | −29.5682 | 0.100 | 1.0 | |
| 28 | −122.6117 | 1.100 | 1.83481 | 42.72 |
| 29 | 20.4649 | 5.500 | 1.0 | |
| 30 | 76.5097 | 3.300 | 1.68893 | 31.07 |
| 31 | −53.0484 | 2.200 | 1.0 | |
| 32 | −20.6632 | 1.000 | 1.80400 | 46.58 |
| 33 | −40.7742 | (Bf) | 1.0 | |

(Aspherical Data)

Surface Number 8

κ=11.0000
$C_4=+1.2646\times10^{-6}$
$C_6=+2.0036\times10^{-10}$
$C_8=-1.5295\times10^{-11}$
$C_{10}=+8.7077\times10^{-14}$ Surface Number 24

κ=−8.4102
$C_4=+6.7848\times10^{-5}$
$C_6=-9.5985\times10^{-8}$
$C_8=+1.7868\times10^{-10}$
$C_{10}=-4.4658\times10^{-13}$ (Variable Intervals While Zooming)

| f | 28.8000 | 106.3785 | 291.0105 |
|---|---|---|---|
| D7 | 1.9493 | 34.6991 | 59.6688 |
| D16 | 29.8215 | 12.7398 | 1.9500 |
| D23 | 7.2945 | 2.1585 | 1.0000 |
| BF | 38.0002 | 77.4692 | 94.2863 |

(movement of the second lens group Δ2);
an imaging magnification is −1/30,
the movement to the object side is assumed to be positive.

| f | 28.8000 | 106.3785 | 291.0105 |
|---|---|---|---|
| Δ2 | 0.7775 | 0.6934 | 2.8624 |

(Values for the Conditional Expressions)
f2B=−63.4466
f2=−17.9826
f2P=+25.8666
f13=+326.7096
f1=+110.3631
(5) |f2B|/|f2|3.528
(6) f2P/|f2B|=0.408
(7) |f2|/(fw·ft)$^{1/2}$=0.196
(8) f13/f1=2.960
(9) D2W/D1T=0.500

Figure 15A:
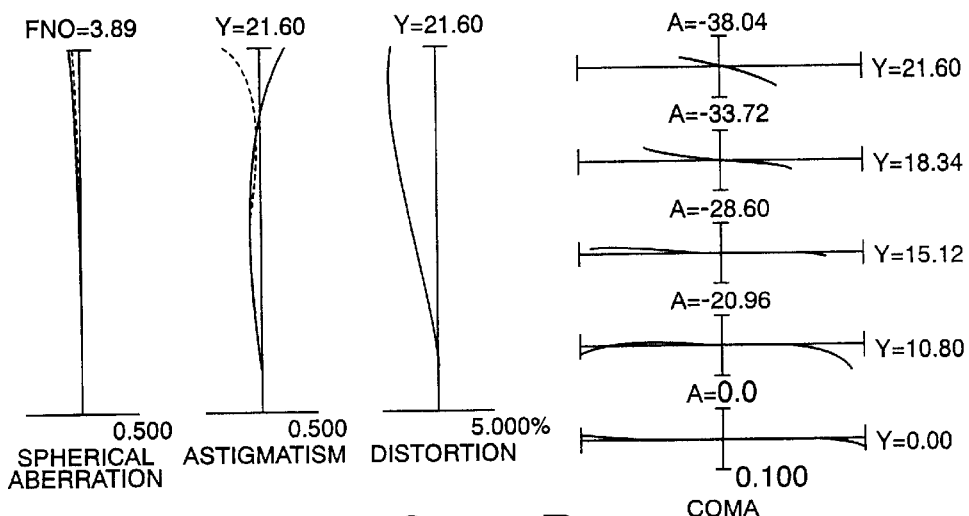
FIGS. 15A–15C are graphs showing various aberrations of Example 5 of the second embodiment in the wide-angle end state, the intermediate focal length state, and the telephoto end state, respectively when focusing at infinity.
Figure 15B:
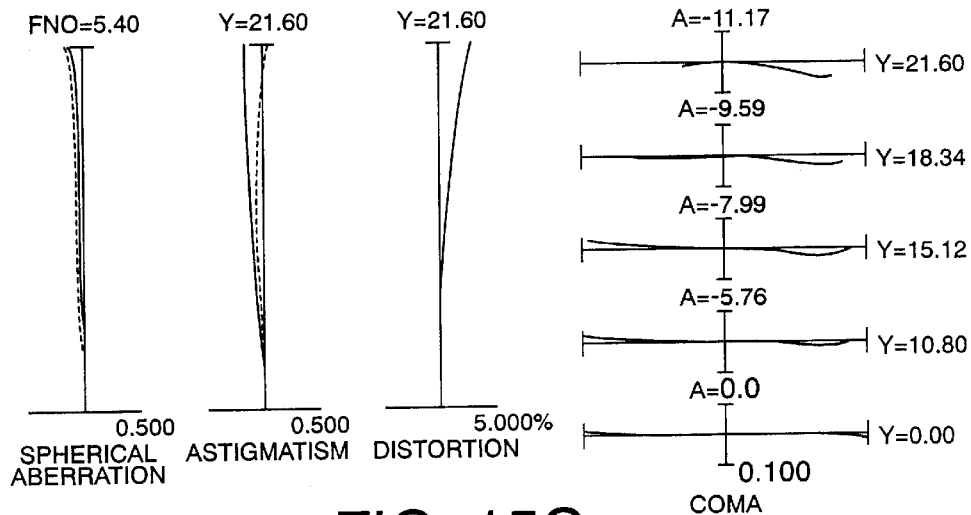
Figure 15C:
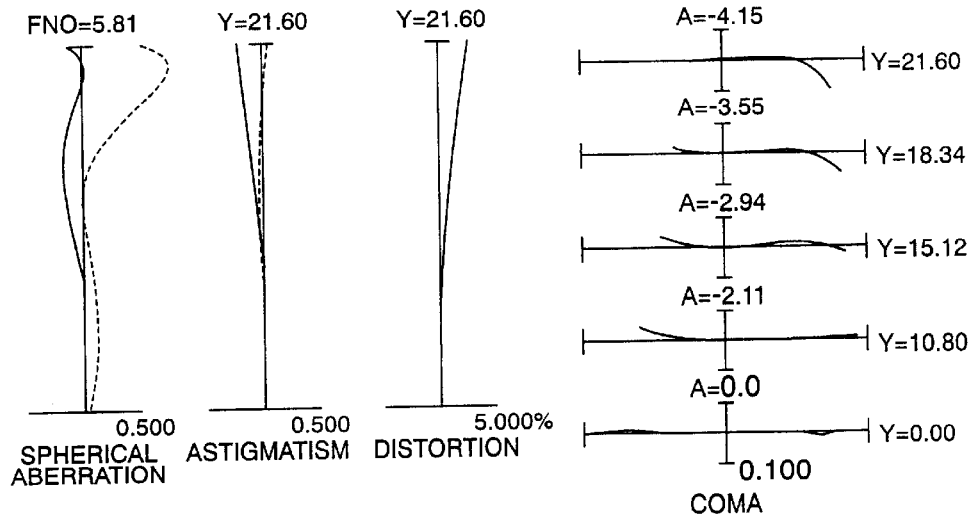

FIGS. 15A–15C are graphs showing various aberrations of Example 5 of the second embodiment in the wide-angle end state (f=28.80), the intermediate focal length state (f=106.3785), and the telephoto end state (f=291.00), respectively when focusing at infinity.

Figure 16A:
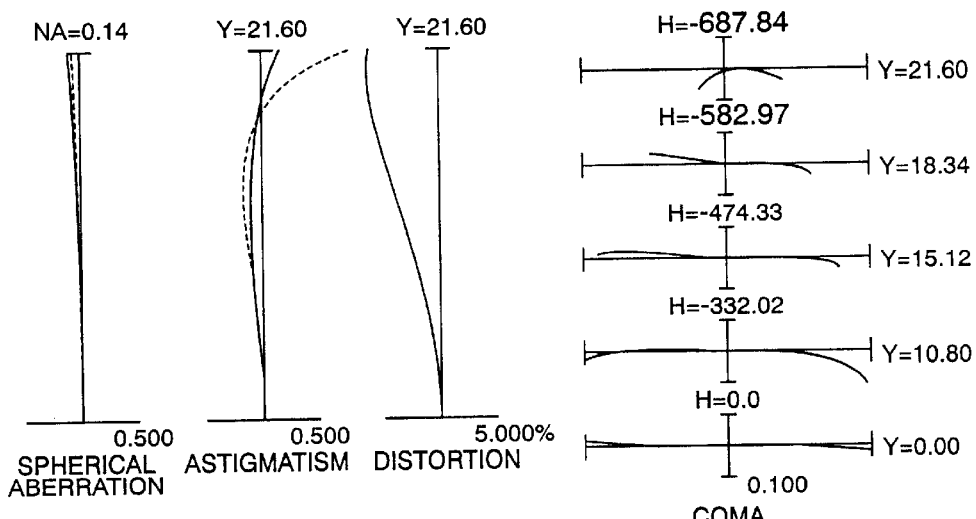
FIGS. 16A–16C are graphs showing various aberrations of Example 5 of the second embodiment in the wide-angle end state, the intermediate focal length state, and the telephoto end state, respectively when focusing at finite distant object.
Figure 16B:
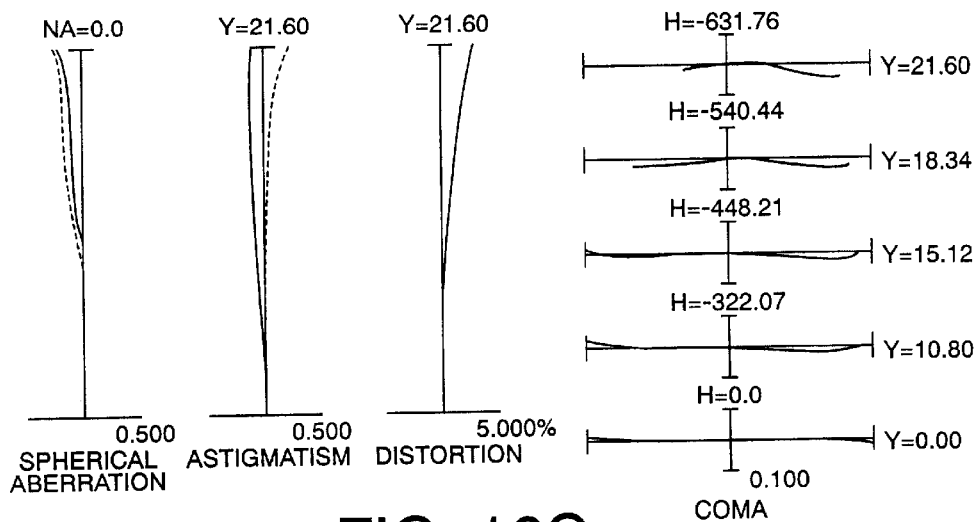
Figure 16C:
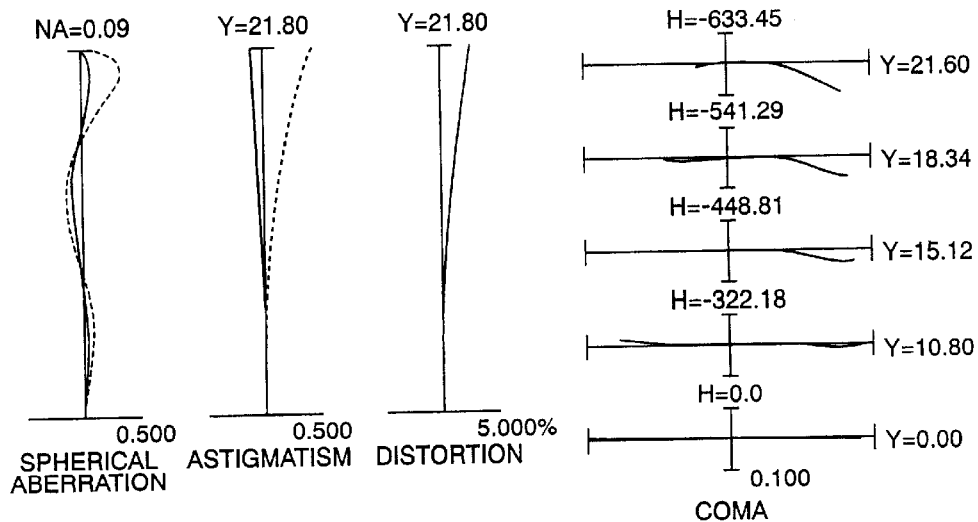

FIGS. 16A–16C are graphs showing various aberrations of Example 5 of the second embodiment in the wide-angle end state (f=28.80), the intermediate focal length state (f=106.3785), and the telephoto end state (f=291.00), respectively when focusing at finite distant object (an imaging magnification is −1/30).

In the respective graphs in FIGS. 15A–16C, and in the graphs showing spherical aberration, a solid line denotes spherical aberration and a broken line denotes sine condition and Y denotes an image height. In the graphs showing astigmatism, a solid line indicates a sagittal image plane, and a broken line indicates a meridional image plane. In the graphs showing coma, A denotes an angle of view, H denotes an object height, and coma at respective image heights Y=0, 10.8, 15.12, 18.34, 21.6 are shown. By the way, in all Examples according to the present invention, the same symbols of this Example are used.

As is apparent from the respective graphs showing various aberrations, excellent compensation is made for various aberrations, and superior optical performance is obtained.

EXAMPLE 6

Figure 17:
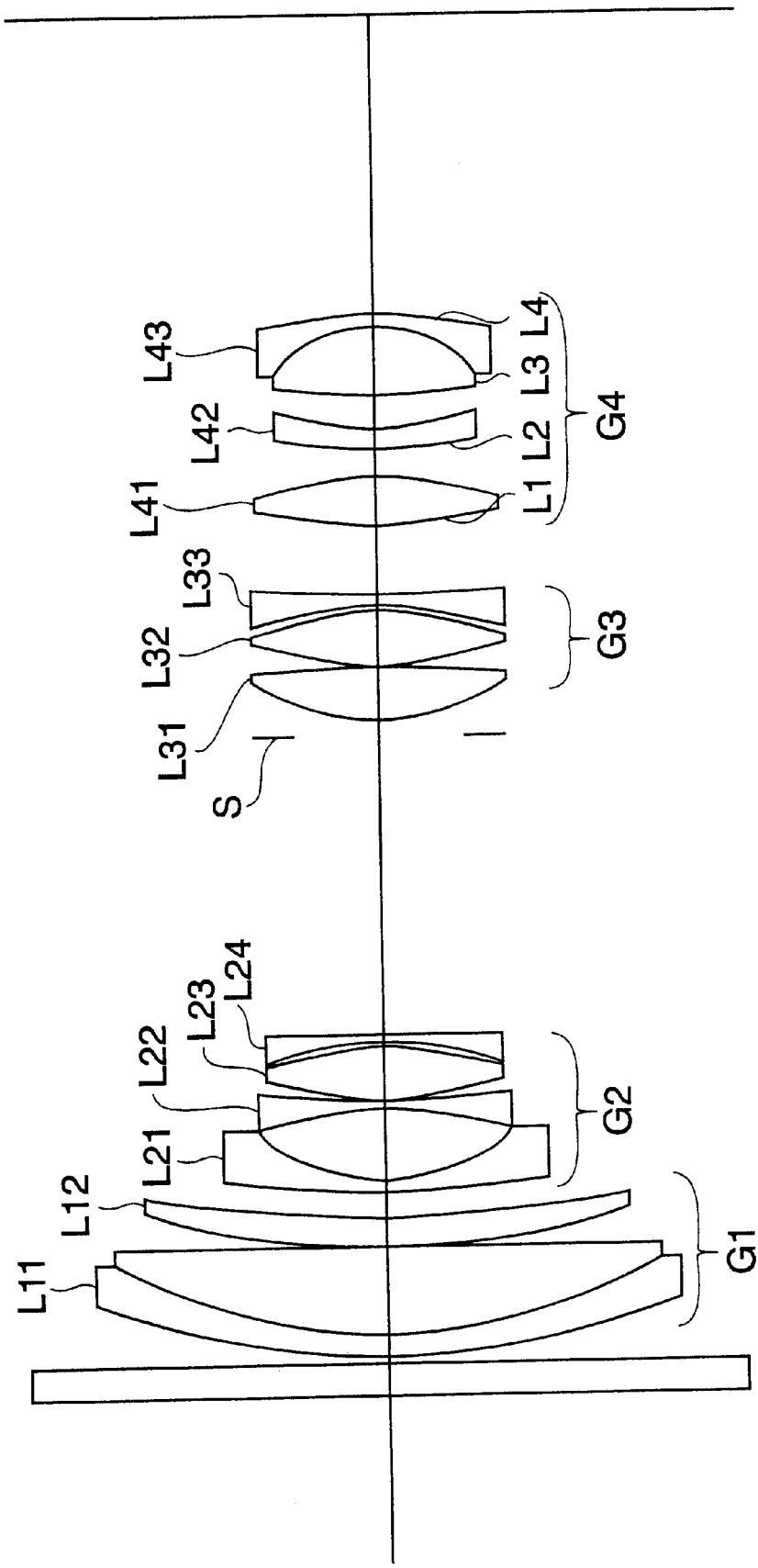
FIG. 17 is a sectional view schematically showing the configuration of a zoom lens system according to Example 6 of the second embodiment of the present invention.

FIG. 17 is a sectional view schematically showing the configuration of a zoom lens system according to Example 6 of the second embodiment of the present invention. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex positive lens L31, a double convex positive lens L32, and a negative lens L33 having a concave surface facing to the object side. A fourth lens group G4 is composed of a double convex positive lens L41, a negative meniscus lens L42 having a convex surface facing to the object side, and a cemented lens L43 constructed by a positive lens element having a convex surface facing to the image side cemented with a negative lens element having a concave surface facing to the object side.

In Example 6, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface.

Various values associated with Example 6 are listed in Table 6.

TABLE 6

(Specifications)

f: 28.80~108.15~291.00
FNO: 3.70~5.23~5.80
2ω: 76.10°~21.91°~8.27°

(Lens Data)

| | r | d | n | ν |
|---|---|---|---|---|
| 1 | 0.0000 | 3.000 | 1.51680 | 64.20 |
| 2 | 0.0000 | 3.870 | 1.0 | |
| 3 | 80.9389 | 2.100 | 1.84666 | 23.78 |
| 4 | 54.7509 | 8.800 | 1.60300 | 65.47 |
| 5 | −2508.6358 | 0.100 | 1.0 | |
| 6 | 75.2640 | 3.000 | 1.72916 | 54.66 |
| 7 | 107.3062 | (D7) | 1.0 | |
| 8 | 78.8585 | 0.300 | 1.55281 | 37.63 |
| 9 | 76.8372 | 1.600 | 1.83481 | 42.72 |
| 10 | 18.3941 | 7.050 | 1.0 | |
| 11 | −37.7867 | 1.000 | 1.80400 | 46.58 |
| 12 | 142.4901 | 0.100 | 1.0 | |
| 13 | 39.8973 | 4.950 | 1.84666 | 23.78 |
| 14 | −44.5206 | 0.950 | 1.0 | |
| 15 | −28.3776 | 1.000 | 1.75500 | 52.32 |
| 16 | 255.3427 | (D16) | 1.0 | |
| 17 | 0.0000 | 1.000 | 1.0 | aperture stop |
| 18 | 29.4347 | 5.150 | 1.49700 | 81.61 |
| 19 | −93.7525 | 0.100 | 1.0 | |
| 20 | 31.7222 | 4.100 | 1.58913 | 61.18 |
| 21 | 431.0363 | 2.100 | 1.0 | |
| 22 | −44.7999 | 1.000 | 1.75520 | 27.51 |
| 23 | 100.8922 | (D23) | 1.0 | |
| 24 | 30.4775 | 5.750 | 1.58913 | 61.18 |
| 25 | −45.8160 | 2.850 | 1.0 | |
| 26 | 47.0047 | 1.100 | 1.80400 | 46.58 |
| 27 | 20.4486 | 3.200 | 1.0 | |
| 28 | 55.9586 | 7.450 | 1.59551 | 39.23 |
| 29 | −13.4318 | 1.000 | 1.83481 | 42.72 |
| 30 | −122.8510 | (Bf) | 1.0 | |

(Aspherical Data)
Surface Number 8
κ=11.0000
$C_4=-4.5487\times10^{-7}$
$C_6=+2.1606\times10^{-10}$
$C_8=-3.9147\times10^{-11}$
$C_{10}=+1.5643\times10^{-13}$
Surface Number 24
κ=−6.8380
$C_4=+2.0873\times10^{-5}$
$C_6=-9.3730\times10^{-8}$
$C_8=+3.0772\times10^{-10}$
$C_{10}=-4.4141\times10^{-13}$
(Variable Intervals While Zooming)

| f | 28.8000 | 108.1496 | 291.0105 |
|---|---|---|---|
| D7 | 1.9625 | 33.4780 | 57.0396 |
| D16 | 30.5530 | 12.8108 | 2.2500 |
| D23 | 6.7231 | 1.9505 | 1.0000 |
| BF | 38.1950 | 79.1948 | 99.0122 |

(movement of the second lens group Δ2);
an imaging magnification is −1/30,
the movement to the object side is assumed to be positive.

| f | 28.8000 | 108.1496 | 291.0105 |
|---|---|---|---|
| Δ2 | 0.7916 | 0.6859 | 2.4820 |

(Values for the Conditional Expressions)
f2B=−62.7533
f2=−17.9821
f2P=+25.5386
f13=+332.5453
f1=+108.2704
(1) |f2B|/|f2|=3.490
(2) f2P/|f2B|=0.407
(3) |f2|/(fw·ft)$^{1/2}$=0.196
(4) f13/f1=3.071
(5) D2W/D1T=0.539

Figure 18A:
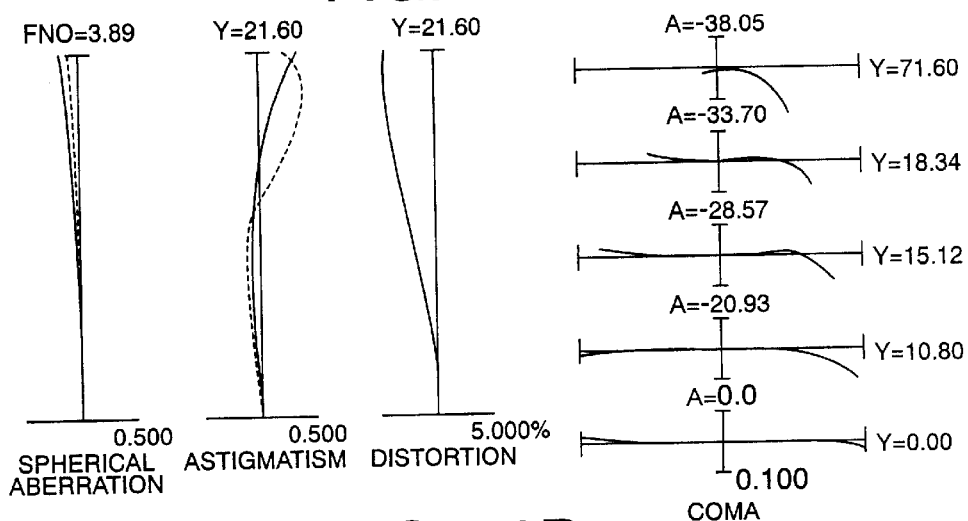
FIGS. 18A–18C are graphs showing various aberrations of Example 6 of the second embodiment in the wide-angle end state, the intermediate focal length state, and the telephoto end state, respectively when focusing at infinity.
Figure 18B:
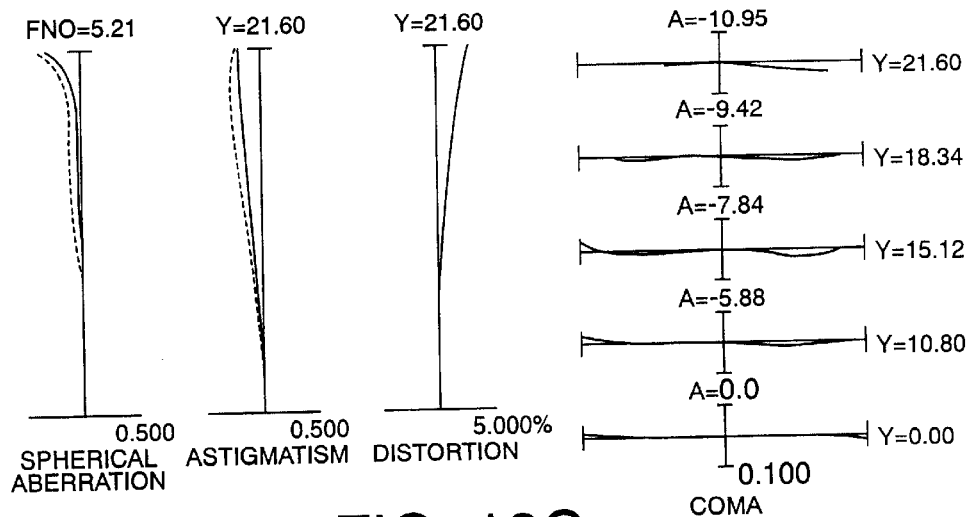
Figure 18C:
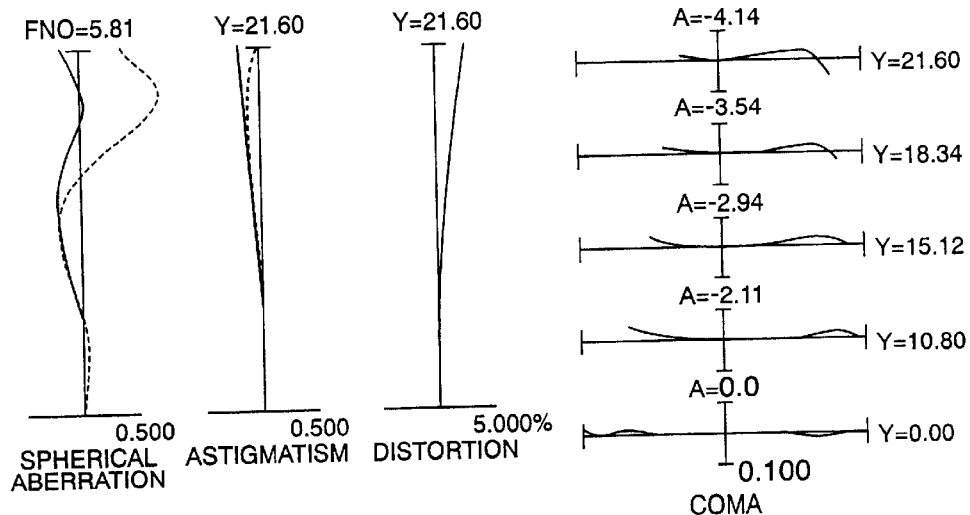

FIGS. 18A–18C are graphs showing various aberrations of Example 6 of the second embodiment in the wide-angle end state (f=28.80), the intermediate focal length state (f=108.1496), and the telephoto end state (f=291.00), respectively when focusing at infinity.

Figure 19A:
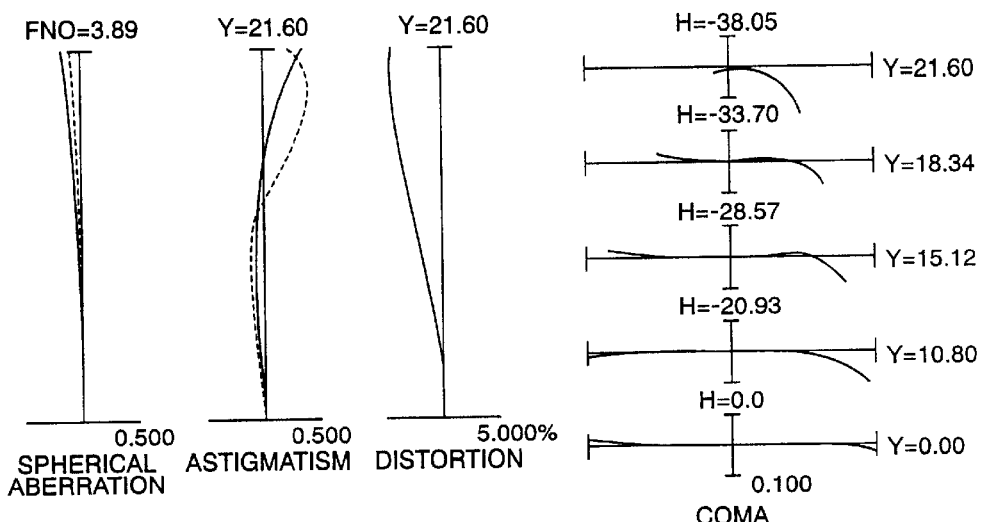
FIGS. 19A–19C are graphs showing various aberrations of Example 6 of the second embodiment in the wide-angle end state, the intermediate focal length state, and the telephoto end state, respectively when focusing at finite distant object.
Figure 19B:
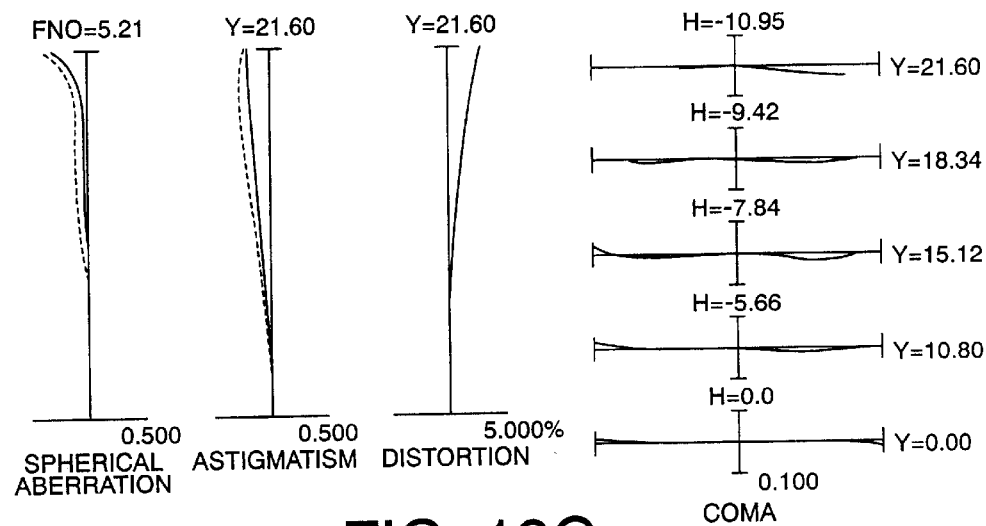
Figure 19C:
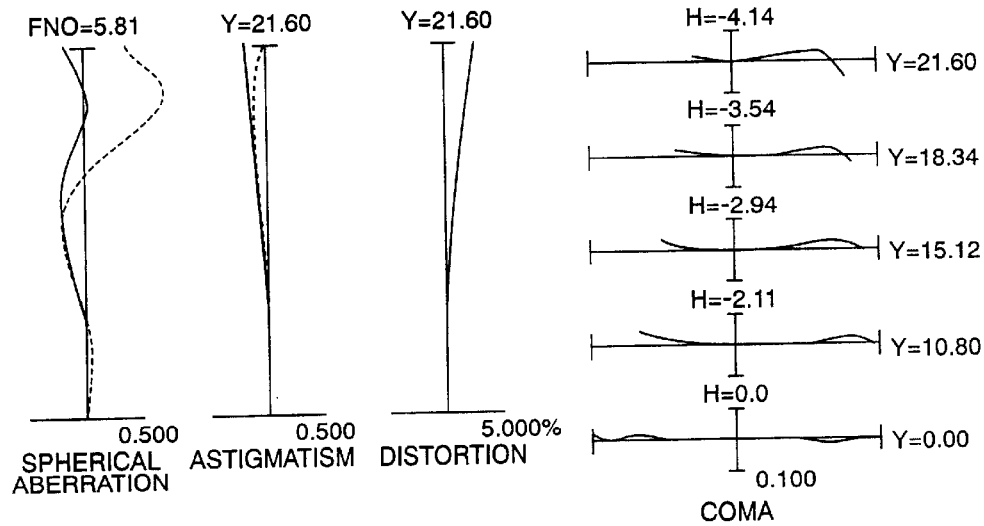

FIGS. 19A–19C are graphs showing various aberrations of Example 6 of the second embodiment in the wide-angle end state (f=28.80), the intermediate focal length state (f=108.1496), and the telephoto end state (f=291.00), respectively when focusing at finite distant object (an imaging magnification is −1/30).

As is apparent from the respective graphs showing various aberrations, excellent compensation is made for various aberrations, and superior optical performance is obtained.

EXAMPLE 7

FIG. 20 is a sectional view schematically showing the configuration of a zoom lens system according to Example 7 of the second embodiment of the present invention. Lens data of Example 7 are the same as those of Example 4. In order from an object, a first lens group G1 is composed of a cemented lens L11 constructed by a negative meniscus lens having a convex surface facing to the object side cemented with a positive lens having a convex surface facing to the object side, and a positive meniscus lens L12 having a convex surface facing to the object side. A second lens group G2 is composed of a negative lens L21 having a concave surface facing to an image side, a negative lens L22 having a concave surface facing to the object side, a positive lens L23 having a convex surface facing to the object side, and a negative lens L24 having a concave surface facing to the object side. A third lens group G3 is composed of a double convex positive lens L31, a double convex positive lens L32, and a negative lens L33 having a concave surface facing to the object side. A fourth lens group G4 is composed of a double convex positive lens L41, a negative meniscus lens L42 having a convex surface facing to the object side, and a cemented lens L43 constructed by a positive lens element having a convex surface facing to the image side cemented with a negative lens element having a concave surface facing to the object side.

In Example 7, an aperture stop S is arranged to the object side of the third lens group G3 and is moved with the third lens group G3 in a body when changing the state of lens group positions. Moreover, the object side of the negative lens L21 is coated with a thin synthetic resin film having an aspherical surface.

Various values associated with Example 7 are listed in Table 7.

TABLE 7

(Specifications)

f: 28.80~106.38~291.00
FNO: 3.70~5.20~5.80
2ω: 76.03°~22.36°~8.27°

(Lens Data)

|  | r | d | n | ν |
|---|---|---|---|---|
| 1 | 0.0000 | 3.000 | 1.51680 | 64.20 |
| 2 | 0.0000 | 3.870 | 1.0 |  |
| 3 | 88.1069 | 2.100 | 1.84666 | 23.78 |
| 4 | 60.2091 | 8.650 | 1.60300 | 65.47 |
| 5 | −7599.3615 | 0.100 | 1.0 |  |
| 6 | 70.5877 | 3.650 | 1.71300 | 53.85 |
| 7 | 152.8294 | (D7) | 1.0 |  |
| 8 | 128.8767 | 0.300 | 1.55281 | 37.63 |
| 9 | 117.8333 | 1.600 | 1.83481 | 42.72 |
| 10 | 17.9048 | 6.200 | 1.0 |  |
| 11 | −39.5006 | 1.000 | 1.80400 | 46.58 |
| 12 | 98.1734 | 0.100 | 1.0 |  |
| 13 | 39.7284 | 4.500 | 1.84666 | 23.78 |
| 14 | −42.0261 | 1.050 | 1.0 |  |
| 15 | −25.4767 | 1.000 | 1.75500 | 52.32 |
| 16 | −287.9484 | (D16) | 1.0 |  |
| 17 | 0.0000 | 1.000 | 1.0 | aperture stop |
| 18 | 32.3616 | 4.200 | 1.60300 | 65.47 |
| 19 | −331.8602 | 0.100 | 1.0 |  |
| 20 | 31.0120 | 5.450 | 1.49700 | 81.61 |
| 21 | −66.6030 | 1.000 | 1.0 |  |
| 22 | −38.6691 | 1.000 | 1.80610 | 33.27 |
| 23 | 100.0000 | (D23) | 1.0 |  |
| 24 | 32.1961 | 5.800 | 1.58913 | 61.18 |
| 25 | −40.6126 | 2.850 | 1.0 |  |
| 26 | 56.0104 | 2.050 | 1.83481 | 42.72 |
| 27 | 21.8451 | 3.550 | 1.0 |  |
| 28 | 59.6688 | 7.200 | 1.58144 | 40.75 |
| 29 | −13.3333 | 1.000 | 1.83481 | 42.72 |
| 30 | −83.1316 | (Bf) | 1.0 |  |

(Aspherical Data)

Surface Number 8

$\kappa = +11.0000$
$C_4 = +3.4170 \times 10^{-6}$
$C_6 = +2.4418 \times 10^{-9}$
$C_8 = -3.5111 \times 10^{-11}$
$C_{10} = +1.7907 \times 10^{-13}$ Surface Number 24

$\kappa = -5.7212$
$C_4 = +1.0672 \times 10^{-5}$
$C_6 = -4.7687 \times 10^{-8}$
$C_8 = +1.6611 \times 10^{-10}$
$C_{10} = -2.3360 \times 10^{-13}$ (Variable Intervals While Zooming)

| f | 28.8002 | 105.7599 | 291.0114 |
|---|---|---|---|
| D7 | 3.1536 | 35.3430 | 58.1569 |
| D16 | 29.1283 | 12.8986 | 2.4000 |
| D23 | 6.3125 | 1.8983 | 1.0000 |
| BF | 39.2561 | 77.7123 | 97.9981 |

(movement of the second lens group Δ2);
an imaging magnification is −1/30,
the movement to the object side is assumed to be positive.

| f | 28.8002 | 105.7599 | 291.0114 |
|---|---|---|---|
| Δ2 | 0.7222 | 0.6577 | 2.5507 |

(Values for the Conditional Expressions)

f2B=−73.0436
f2=−17.2290
f2P=+24.7457
f13=+260.0970
f1=+106.2460
(5) |f2B|/|f2|=4.240
(6) f2P/|f2B|=0.339
(7) |f2|/(fw·ft)$^{1/2}$=0.188
(8) f13/f1=2.448
(9) D2W/D1T=0.501

Figure 21A:
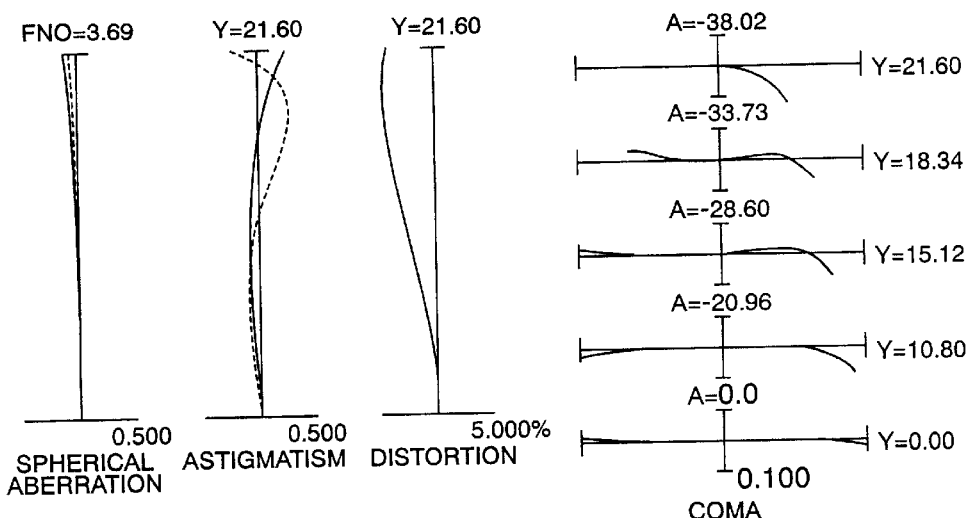
FIGS. 21A–21C are graphs showing various aberrations of Example 7 of the second embodiment in the wide-angle end state, the intermediate focal length state, and the telephoto end state, respectively when focusing at infinity.
Figure 21B:
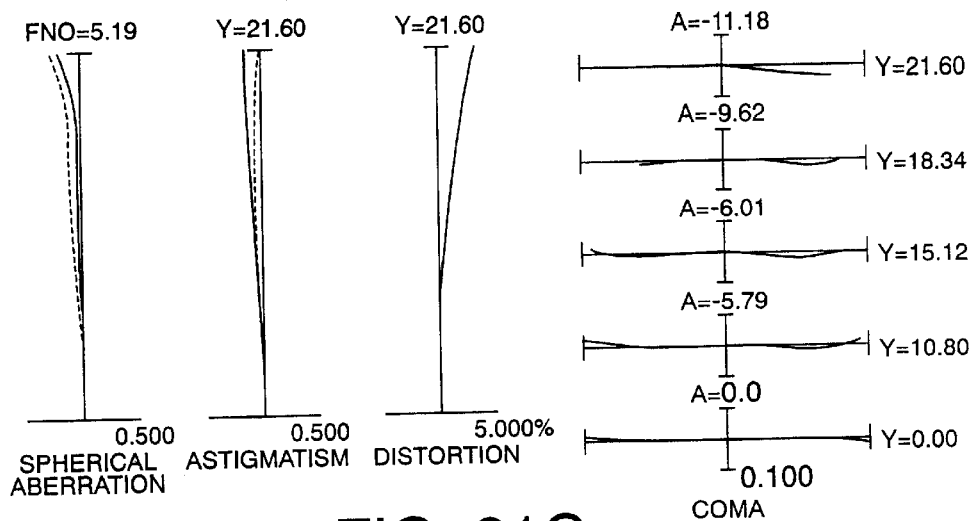
Figure 21C:
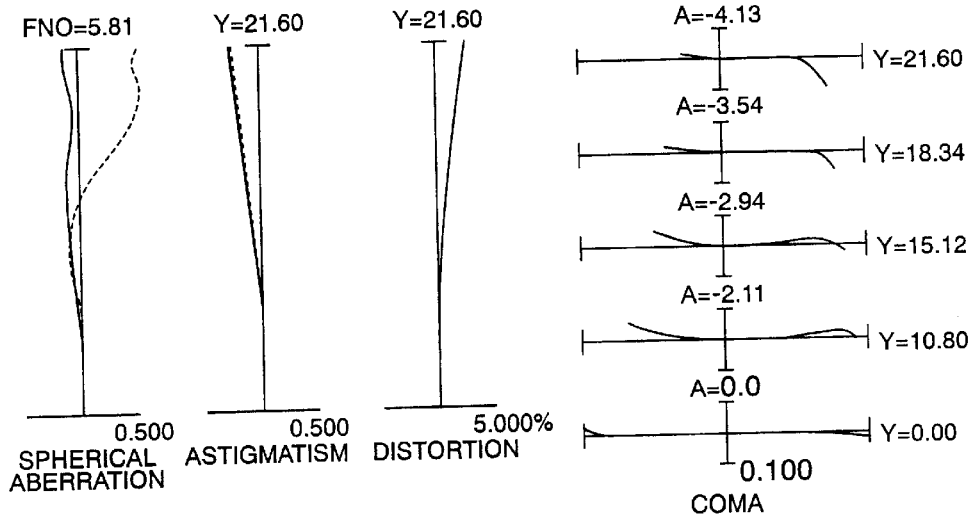

FIGS. 21A–21C are graphs showing various aberrations of Example 7 of the second embodiment in the wide-angle end state (f=28.80), the intermediate focal length state (f=105.7599), and the telephoto end state (f=291.00), respectively when focusing at infinity.

Figure 22A:
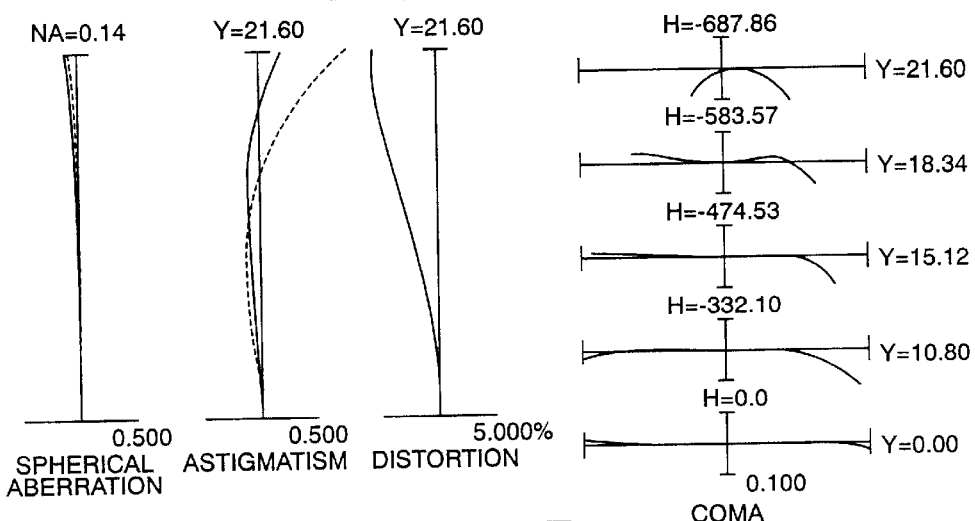
FIGS. 22A–22C are graphs showing various aberrations of Example 7 of the second embodiment in the wide-angle end state, the intermediate focal length state, and the telephoto end state, respectively when focusing at finite distant object.
Figure 22B:
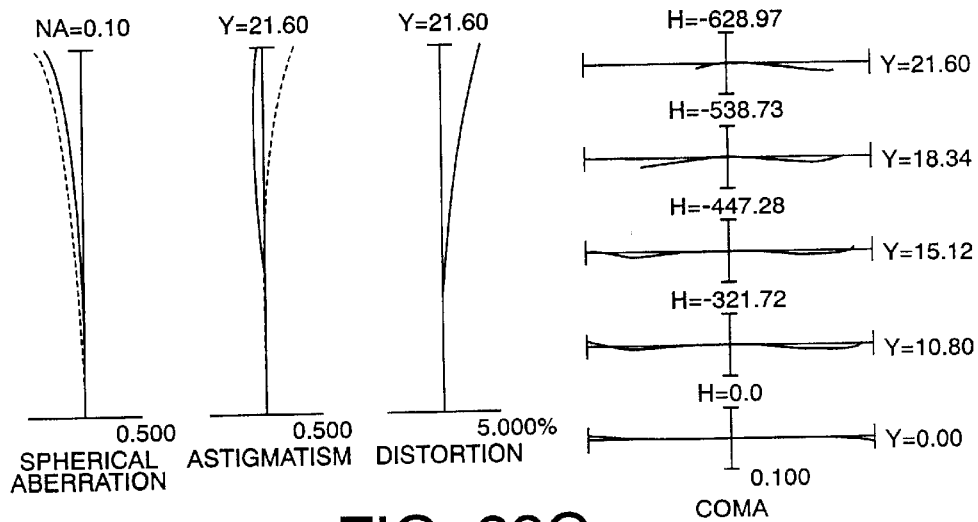
Figure 22C:
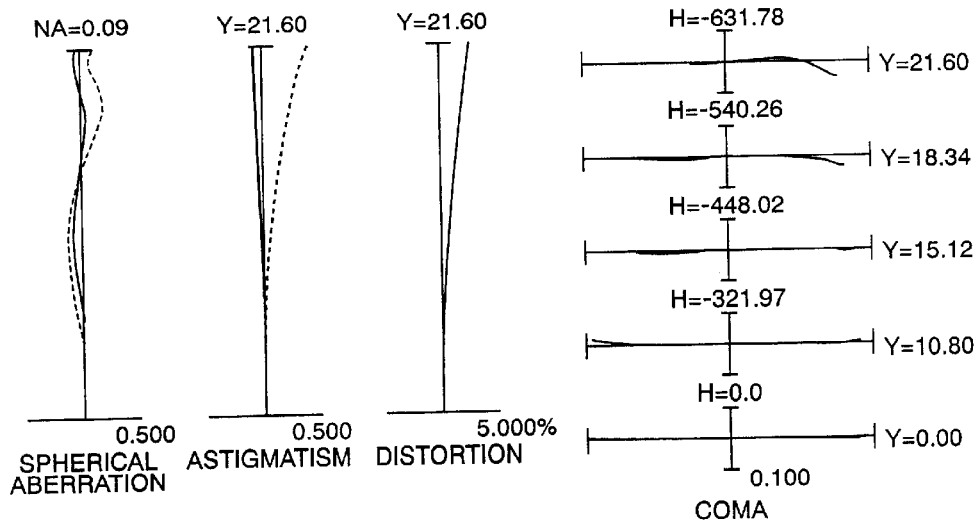

FIGS. 22A–22C are graphs showing various aberrations of Example 7 of the second embodiment in the wide-angle end state (f=28.80), the intermediate focal length state (f=105.7599), and the telephoto end state (f=291.00), respectively when focusing at finite distant object (an imaging magnification is −1/30).

As is apparent from the respective graphs showing various aberrations, excellent compensation is made for various aberrations, and superior optical performance is obtained.

In the present invention, from another point of view, it is possible that the zoom lens system is made to be an anti-vibration optical system preventing image blurring caused by camera shake, or the like, liable to be occurred to a high-zoom-ratio lens while shooting. In order to prevent this, a moving detector detecting camera shake and a driving unit are combined to the optical system, and the optical system is constructed such that a whole lens group or a portion of a lens group comprising the optical system can be decentered as a decentering lens group. Image blurring can be corrected by detecting camera shake by the moving detector, decentering the decentering lens group by the driving unit, and shifting image by the decentering lens group. In this construction, an optical system can be made to be an anti-vibration optical system being able to prevent image blurring.

Furthermore, the present invention can be applied not only to a zoom lens system but also to a variable focal lens system whose focal length does not exist continuously.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power;
   a third lens group having positive refractive power; and
   a fourth lens group having positive refractive power;
   each lens group being moved to the object side such that when the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases;
   an aperture stop being arranged in the vicinity of the third lens group; and
   the fourth lens group being composed of four lens elements arranged, in order from the object;
   a first positive lens element;
   a first negative lens element;
   a second positive lens element; and
   a second negative lens element.

2. The zoom lens system according to claim 1, wherein;
   the first positive lens element has a double convex shape; and
   the first negative lens element has a meniscus shape having a convex surface facing to the object side.

3. The zoom lens system according to claim 2, wherein the following conditional expression is satisfied:

$$0.12 < r41/r42 < 0.45 \quad (1)$$

where r41 denotes the radius of curvature to the object side of the first positive lens element arranged to the most object side of the fourth lens group, and r42 denotes the radius of curvature to the image side of the first negative lens element arranged second in order from the object side of the fourth lens group.

4. The zoom lens system according to claim 3, wherein the second positive lens element and the second negative lens element are cemented together forming a cemented lens having positive refractive power.

5. The zoom lens system according to claim 4, wherein at least one of the following conditional expressions is satisfied:

$$0.15 < D1/ft < 0.25 \quad (2)$$

$$0.15 < |f2|/(fw \cdot ft)^{1/2} < 0.25 \quad (3)$$

where D1 denotes the separation along the optical axis between the first lens group and the second lens group in the telephoto end state, ft denotes the focal length of the zoom lens system as a whole in the telephoto end state, f2 denotes the focal length of the second lens group, and fw denotes the focal length of the zoom lens system as a whole in the wide-angle end state.

6. The zoom lens system according to claim 5, wherein the following conditional expression is satisfied:

$$0.5 < d2/d1 < 2 \quad (4)$$

where d2 denotes the separation between the first negative lens element arranged second in order from the object side of the fourth lens group and the second positive lens element arranged to the image side of the first negative lens element, and d1 denotes the separation between the first positive lens element arranged most object side of the fourth lens group and the first negative lens element arranged to the image side of the first positive lens element.

7. The zoom lens system according to claim 2, wherein the second positive lens element and the second negative lens element are cemented together forming a cemented lens having positive refractive power.

8. The zoom lens system according to claim 7, wherein at least one of the following conditional expressions is satisfied:

$$0.15 < D1/ft < 0.25 \quad (2)$$

$$0.15 < |f2|/(fw \cdot ft)^{1/2} < 0.25 \quad (3)$$

where D1 denotes the separation along the optical axis between the first lens group and the second lens group in the telephoto end state, ft denotes the focal length of the zoom lens system as a whole in the telephoto end state, f2 denotes the focal length of the second lens group, and fw denotes the focal length of the zoom lens system as a whole in the wide-angle end state.

9. The zoom lens system according to claim 8, wherein the following conditional expression is satisfied:

$$0.5 < d2/d1 < 2 \quad (4)$$

where d2 denotes the separation between the first negative lens element arranged second in order from the object side of the fourth lens group and the second positive lens element arranged to the image side of the first negative lens element, and d1 denotes the separation between the first positive lens element arranged most object side of the fourth lens group and the first negative lens element arranged to the image side of the first positive lens element.

10. The zoom lens system according to claim 1, wherein at least one of the following conditional expressions is satisfied:

$$0.15 < D1/ft < 0.25 \quad (2)$$

$$0.15 < |f2|/(fw \cdot ft)^{1/2} < 0.25 \quad (3)$$

where D1 denotes the separation along the optical axis between the first lens group and the second lens group in the telephoto end state, ft denotes the focal length of the zoom lens system as a whole in the telephoto end state, f2 denotes the focal length of the second lens group, and fw denotes the focal length of the zoom lens system as a whole in the wide-angle end state.

11. The zoom lens system according to claim 10, wherein the following conditional expression is satisfied:

$$0.5 < d2/d1 < 2 \quad (4)$$

where d2 denotes the separation between the first negative lens element arranged second in order from the object side of the fourth lens group and the second positive lens element arranged to the image side of the first negative lens element, and d1 denotes the separation between the first positive lens element arranged most object side of the fourth lens group and the first negative lens element arranged to the image side of the first positive lens element.

12. A zoom lens system comprising, in order from an object:
   a first lens group having positive refractive power;

a second lens group having negative refractive power;
a third lens group having positive refractive power; and
a fourth lens group having positive refractive power;
each lens group being moved to the object side such that when the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases;
the second lens group being composed of four lens elements arranged, in order from the object:
a negative lens having a concave surface facing to an image side;
a double concave negative lens;
a double convex positive lens; and
a negative lens having a concave surface facing to the object side; and
the following conditional expressions being satisfied:

$$3 < |f2B|/|f2| < 5 \quad (5)$$

$$0.3 < f2P/|f2B| < 0.45 \quad (6)$$

$$0.45 < D2W/D1T < 0.60 \quad (9)$$

where f2B denotes the focal length of the three lenses arranged to the image side in the second lens group which has four lens elements, f2 denotes the focal length of the second lens group, and f2P denotes the focal length of the double convex positive lens arranged in the second lens group, and where D2W denotes the separation along the optical axis between the second lens group and the third lens group in the wide-angle end state, and D1T denotes the separation along the optical axis between the first lens group and the second lens group in the telephoto end state.

13. The zoom lens system according to claim 12, wherein the following conditional expression is satisfied:

$$0.14 < |f2|/(fw \cdot ft)^{1/2} < 0.24 \quad (7)$$

where ft denotes the focal length of the zoom lens system as a whole in the telephoto end state, and fw denotes the focal length of the zoom lens system as a whole in the wide-angle end state.

14. The zoom lens system according to claim 13, wherein an aperture stop is arranged between the second lens group and the third lens group.

15. The zoom lens system according to claim 14, wherein the aperture step is moved with the third lens group in a body while changing the state of lens group positions.

16. The zoom lens system according to claim 12, wherein the first lens group is composed of, in order from the object, a cemented lens constructed by a negative meniscus lens having a convex surface facing to the object side and a positive lens having a convex surface facing to the object side together, and a positive meniscus lens having a convex surface facing to the object.

17. The zoom lens system according to claim 16, wherein the following conditional expression is satisfied:

$$0.45 < D2W/D1T < 0.60 \quad (9)$$

where D2W denotes the separation along the optical axis between the second lens group and the third lens group in the wide-angle end state, and D1T denotes the separation along the optical axis between the first lens group and the second lens group in the telephoto end state.

18. A zoom lens system comprising, in order from an object:
a first lens group having positive refractive power;
a second lens group having negative refractive power;
a third lens group having positive refractive power; and
a fourth lens group having positive refractive power;
each lens group being moved to the object side such that when the state of lens group positions of the zoom lens system is changed from a wide-angle end state to a telephoto end state, the separation between the first lens group and the second lens group increases, the separation between the second lens group and the third lens group decreases, and the separation between the third lens group and the fourth lens group decreases;
the second lens group being composed of four lens elements arranged, in order from the object:
a negative lens having a concave surface facing to an image side;
a double concave negative lens;
a double convex positive lens; and
a negative lens having a concave surface facing to the object side; and
the following conditional expressions being satisfied:

$$3 < |f2B|/|f2| < 5 \quad (5)$$

$$0.3 < f2P/|f2B| < 0.45 \quad (6)$$

where f2B denotes the focal length of the three lenses arranged to the image side in the second lens group which has four lens elements, f2 denotes the focal length of the second lens group, and f2P denotes the focal length of the double convex positive lens arranged in the second lens group; and
wherein the first lens group is composed of three lenses arranged, in order from the object, a negative lens having a convex surface facing to the object side, a first positive lens having a convex surface facing to the object side, and a second positive lens having a convex surface facing to the object side, and wherein the following conditional expression is satisfied:

$$2 < f13/f1 < 4 \quad (8)$$

where f13 denotes the focal length of the positive lens arranged to the image side in the first lens group which has two positive lenses, and f1 denotes the focal length of the first lens group.

19. The zoom lens system according to claim 12, wherein the following conditional expression is satisfied:

$$0.14 < |f2|/(fw \cdot ft)^{1/2} < 0.24 \quad (7)$$

where ft denotes the focal length of the zoom lens system as a whole in the telephoto end state, and fw denotes the focal length of the zoom lens system as a whole in the wide-angle end state.

20. The zoom lens system according to claim 19, wherein an aperture stop is arranged between the second lens group and the third lens group.

21. The zoom lens system according to claim 20, wherein the aperture stop is moved with the third lens group in a body while changing the state of lens group positions.

* * * * *